United States Patent [19]
Torii et al.

[11] Patent Number: 5,773,947
[45] Date of Patent: Jun. 30, 1998

[54] POSITION DETECTOR AND POSITION CONTROL METHOD FOR A MOVING BODY

[75] Inventors: Katsuhiko Torii, Hamana-gun; Kengo Yamamura, Inasa-gun; Masafumi Yamaura, Nishio; Makihiro Ishikawa, Okazaki; Yoshihisa Sato, Nagoya, all of Japan

[73] Assignees: ASMO Co., Ltd., Kosai; Nippondenso Co., Ltd., Kariya, both of Japan

[21] Appl. No.: 437,876

[22] Filed: May 9, 1995

[30] Foreign Application Priority Data

May 11, 1994 [JP] Japan ................................... 6-097420
Jul. 27, 1994 [JP] Japan ................................... 6-175873

[51] Int. Cl.⁶ .................................................. B60J 7/04
[52] U.S. Cl. ........................ 318/466; 318/467; 318/283; 160/9; 296/223
[58] Field of Search .................. 318/466–470, 318/280, 287–293, 1, 2, 9–15; 49/18, 146, 280; 296/223; 160/7, 310, 331, 9; 297/330, 344.17, 344.12

[56] References Cited

U.S. PATENT DOCUMENTS

| | | |
|---|---|---|
| 3,980,846 | 9/1976 | Yoshida . |
| 4,267,668 | 5/1981 | Natinsky . |
| 4,468,063 | 8/1984 | Yukimoto et al. ...................... 296/223 |
| 4,530,185 | 7/1985 | Moriya et al. ............................ 49/280 |
| 4,659,141 | 4/1987 | Masuda et al. . |
| 4,920,784 | 5/1990 | Gonsior . |
| 4,985,225 | 1/1991 | Hashimoto et al. . |
| 4,994,724 | 2/1991 | Hsu ......................................... 318/603 |
| 5,174,425 | 12/1992 | Takahashi et al. ........................ 192/66 |
| 5,222,327 | 6/1993 | Fellows et al. . |

FOREIGN PATENT DOCUMENTS

| | | |
|---|---|---|
| 0 323 603 | 7/1989 | European Pat. Off. . |
| 0 359 853 | 3/1990 | European Pat. Off. . |
| 38 28 598 | 5/1989 | Germany . |
| 1-37291 | 8/1989 | Japan . |
| 2-190587 | 7/1990 | Japan . |
| 5-211747 | 8/1993 | Japan . |

Primary Examiner—Brian Sircus
Attorney, Agent, or Firm—Burns, Doane, Swecker & Mathis, LLP

[57] ABSTRACT

In a position detector, a ring gear rotates with a motor output shaft and a specified rotation position is detected by a move contact and fixed contacts. When the output shaft rotates thereafter, holding a carrier by a wave washer is released and the transmission of rotation of the output shaft to the ring gear is dropped. Therefore, by rotating the output shaft sufficiently at the time of assembling, an initial state, in which a protrusion section abuts a protrusion and the move contact contacts the fixed contact, is set automatically.

21 Claims, 37 Drawing Sheets

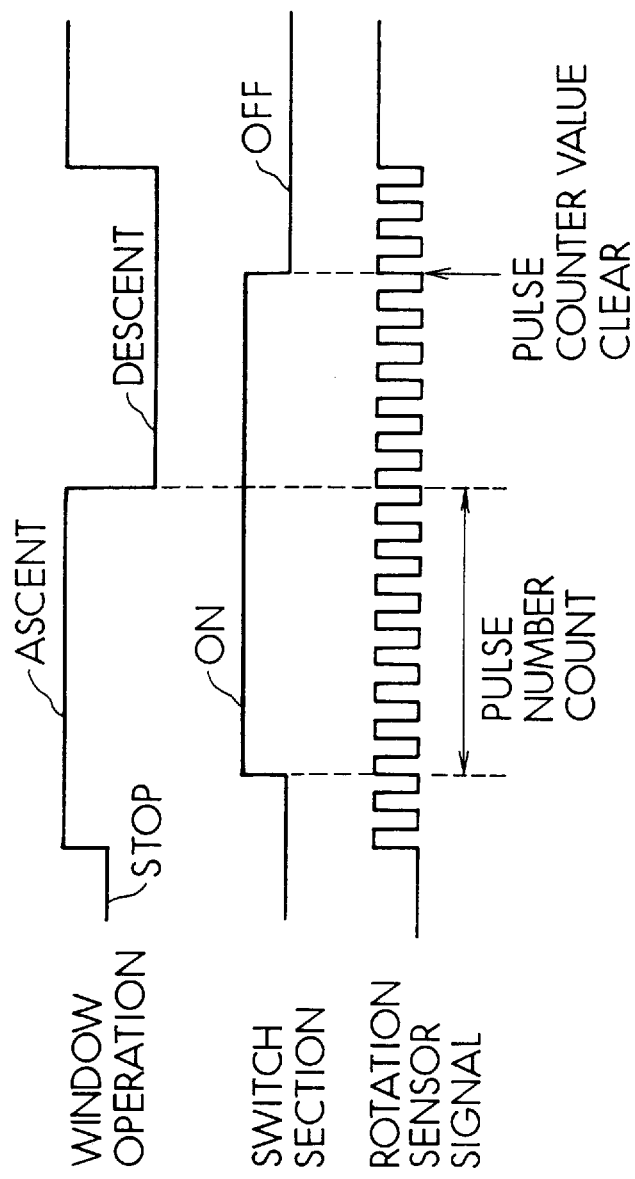

POSITION DETECTOR AND POSITION CONTROL METHOD FOR A MOVING BODY

CROSS REFERENCE TO RELATED APPLICATIONS

This application is based on and claims priorities of Japanese Patent Applications No. 6-97420 filed on May 11, 1994 and No. 6-175873 filed on Jul. 27, 1994, the contents of which are incorporated herein by reference.

BACKGROUND OF THE INVENTION

1. Field of the Invention

The present invention generally relates to a position detector and a position control method used for a moving body, e.g., a power window device that opens and closes vehicle door window glasses up and down or a sunroof device that opens and closes sunroofs.

2. Description of Related Art

For example, a motor has been used as a driving source for power window device that opens and closes vehicle door window glasses or sunroof device that opens and closes sunroofs.

In power window devices, a catch prevention function is provided that prevents accidental catching of passenger's body and foreign objects between a window glass and a window frame. In such power window devices equipped with this kind of catch prevention function, some has a limit switch provided at a specified position in the door and determines whether or not some obstacle has been caught in the window glass based on a signal from the limit switch and a lock current of a motor, to control movement of the window glass, i.e., the rotation position of the motor, while the other has a Hall IC or a special commutator for detecting rotation number of an armature and determines whether or not some obstacle has been caught based on rotation number detection signal (pulse number or width of pulse signals) to control the rotation position of the motor.

In those power window devices (motor rotation position detection mechanism) has disadvantages in that cumbersome adjustment of assembling position is required during assembling work of the motor and a window regulator, and cumbersome resetting after assembling is also required.

For example, in the type with the catch prevention mechanism using the signal from the limit switch located in the door and the motor lock current, cumbersome adjustment of assembling position and many parts are required, because, at the time of assembling the motor and the window regulator, it is necessary not only to attach them to the vehicle in a condition that a vertical position of the window glass and a specified rotation position of a motor rotation shaft correspond to one another, but also to attach the limit switch in correspondence to a specified position of the window glass. Furthermore, even when limit switch or the like is attached at the most appropriate position at the first assembling stage, it need to be adjusted every time loosening or the like occurs during use. Furthermore, even in the case of the catch prevention mechanism configured based on the rotation number detection signal (pulse signals) of the armature, as is in the above-mentioned case, even if the motor rotation shaft is assembled to correspond to the window glass at the first assembling stage, the positional relationship of the window glass and the motor rotation shaft must be reset every time loosening or the like occurs.

Thus, in the conventional mechanisms used in the power window device or the sunroof device and detects the motor rotation position, it is required to perform cumbersome adjustment of assembling position and cumbersome resetting after the assembling work. Further, in the cases where the catch prevention mechanism is provided, other additional expensive parts such as a control device is required and accuracy is not improved so much.

SUMMARY OF THE INVENTION

It is an object of this invention to provide a position detector and a position control method for a moving body used for power window and sunroof devices, wherein positions of window glasses or sunroofs are detected accurately, the movement thereof are controlled, an initial position without cumbersome adjustment is set and a simple construction can be obtained with low cost.

According to a position detector for a moving body of the present invention, when a moving body moves in the forward and reverse directions, the moving force is transmitted to an actuation mechanism and the actuation mechanism is then linked to the moving body. When the moving body reaches the specified position, a switch section is actuated by the actuation mechanism, and thus the specified move position of the moving body is detected.

When the switch section is actuated, a clutch mechanism shuts off the transmission of the rotation force in the forward direction from an output shaft to the actuation mechanism. That is, once the switch section has been actuated, the actuation mechanism does not move even if the output shaft moves in the forward direction, and the operation state of the switch section is maintained. In other words, by sufficiently moving the moving body in the forward direction once, the switch section is automatically set to its initial operation state.

Therefore, when this position detector is used in power window devices having a catch prevention mechanism or its driving motor, for example, by rotating the output shaft of the motor sufficiently in the forward direction once at the time of assembling to the vehicle, the switch section is automatically set to its initial operation state. The initial position can be set easily without cumbersome positional adjustment at the time of assembling and cumbersome resetting after the assembling work.

Furthermore, counters are essential to a control circuit of the detector configured to detect the move position of the motor rotation shaft, i.e., window glass, by detecting the armature rotation number of the power window device drive motor through a Hall IC or the like. However, this position detector does not require the counters and can be provided in low cost, because it is capable of accurately determining the position from a single ON/OFF signal.

According to a position control method for a moving body of the present invention, a switch means detects when a moving body moves in the forward direction and reaches a reference move position, thereafter a move amount detection means detects the move amount of the moving body moving beyond the reference move position as a pulse signal. Whether or not the moving body has reached the specified move position is determined based on the detected move amount.

That is, no matter where the reference move position is set, the move amount thereafter is detected and controlled based on the pulse signal. Thus, even if the reference move position is different from every applied device, by passing the moving body through the reference move position once, the move position of the moving body thereafter can be detected and controlled linearly and accurately. Whether or not the moving body has reached the specified move position is determined accurately. In other words, since the reference move position can be set to any position, it is not necessary to change the switch means (itself and its placement position) for every applied device, and the switch means can be common (standardization).

BRIEF DESCRIPTION OF THE ACCOMPANYING DRAWINGS

Figure 38:
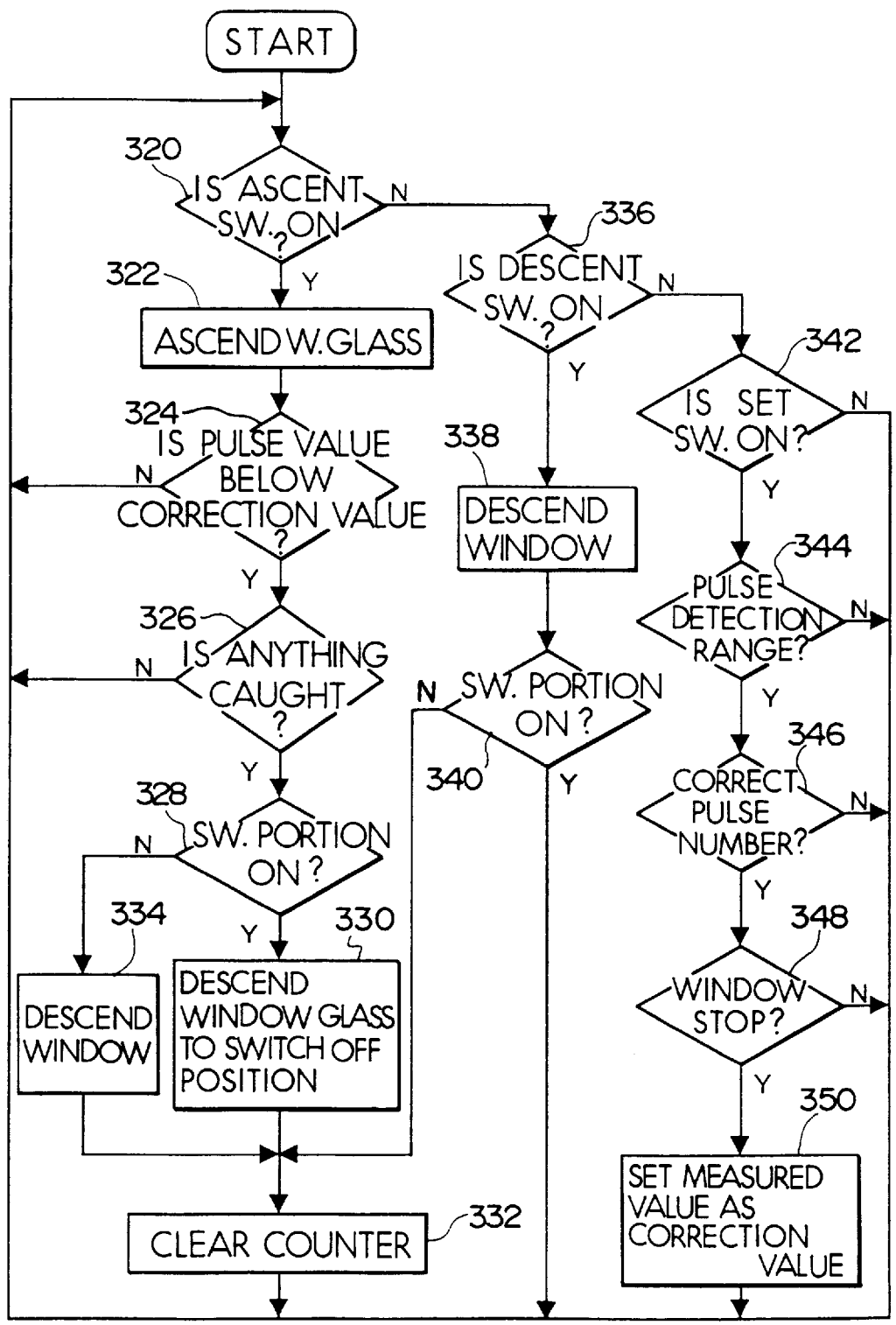

FIG. 38 is a flow diagram illustrating the control program in the case of operating the ascent switch or the descent switch of the power window in the seventh embodiment of the present invention; and FIG. 39 is a waveform diagram illustrating the corresponding relationship to the move state and the signal by the switch and the pulse signal by the rotation sensor of the window glass in the power window device in the seventh embodiment of the present invention.

DETAILED DESCRIPTION OF THE PREFERRED EMBODIMENTS

The present invention will be described in detail with reference to presently preferred embodiments illustrated in the accompanying drawings.

(First Embodiment)

Figure 3:
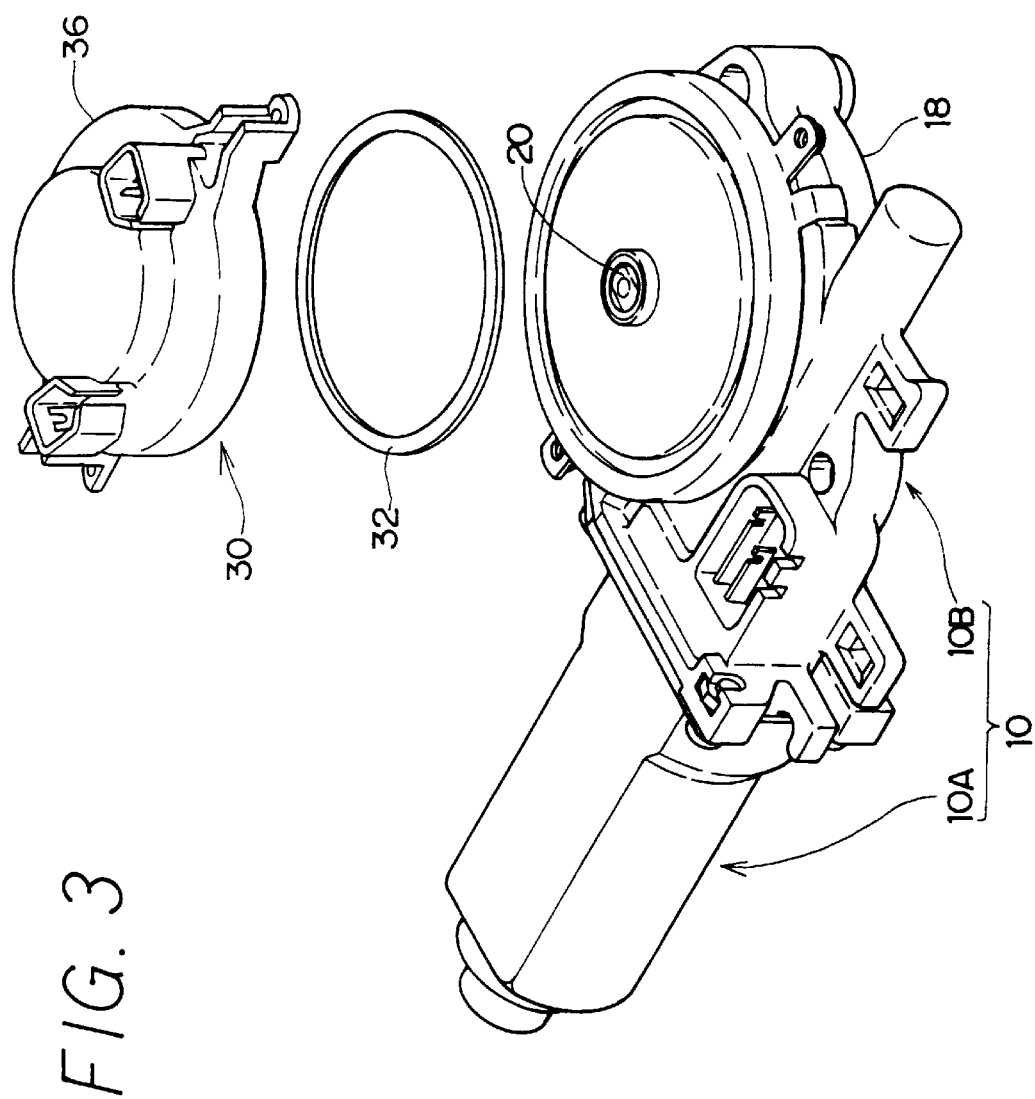
FIG. 3 is an overall perspective view of the motor for a power window device applied with the first embodiment of the present invention.
Figure 4:
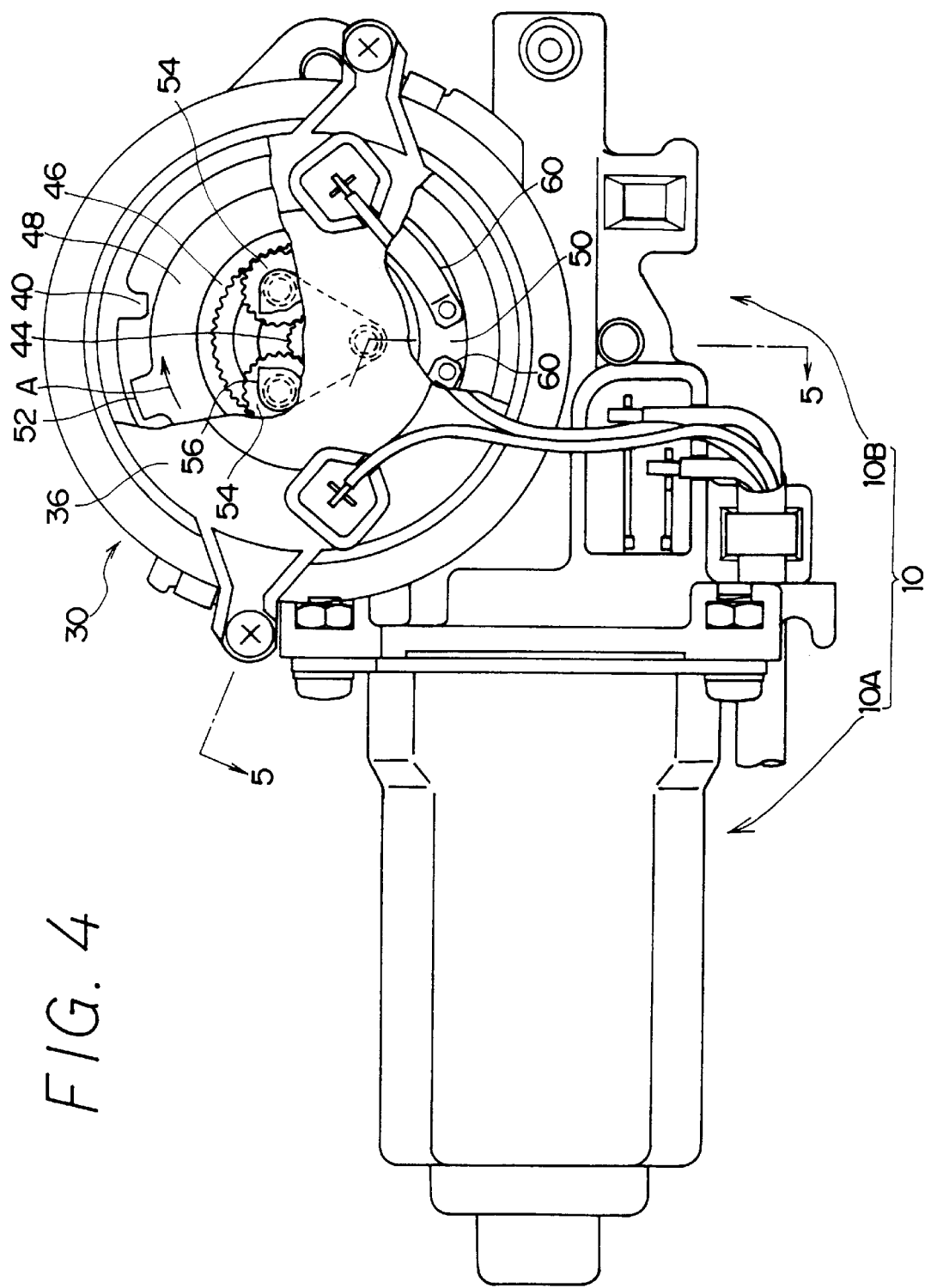
FIG. 4 is a partially ruptured plan view of the motor for the power window device applied with the first embodiment of the present invention.
Figure 5:
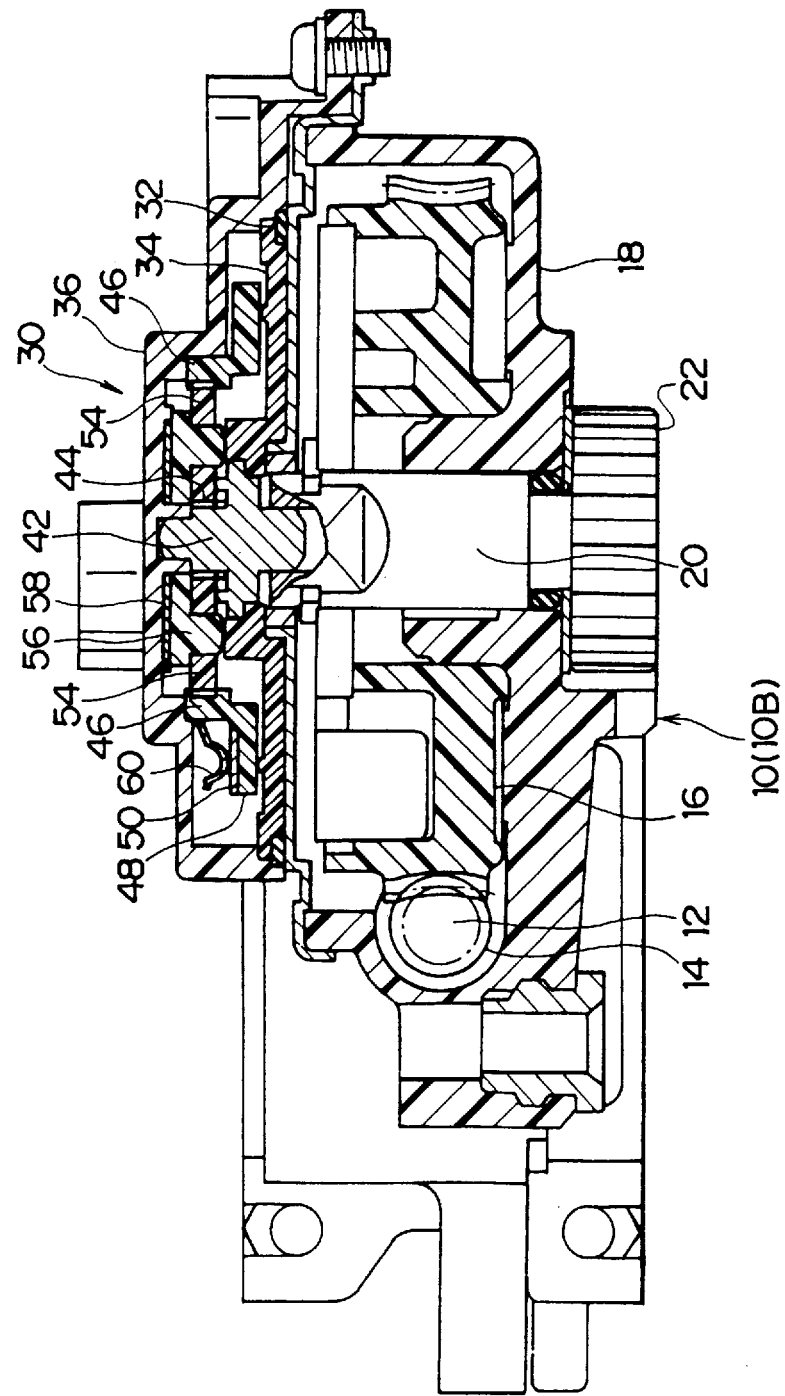
FIG. 5 is a cross-sectional view taken along the line 5—5 in FIG. 4 of the motor for the power window device applied with the first embodiment of the present invention.

FIG. 3 shows the general perspective view of a motor 10 for a power window device to which a position detector 30 according to the first embodiment of the pre sent invention is applied. FIG. 4 shows the plan view of the motor 10 partly in cross section, and FIG. 5 shows the cross-sectional view of the motor 10 taken along the line 5—5 in FIG. 4.

The motor 10 is configured of a motor portion 10A and a gear portion 10B connected to the motor portion 10A. The rotation shaft 12 of the motor portion 10A extends into the gear portion 10B, and the worm gear 14 is formed at the top end thereof. The worm gear 14 engages with a rotation gear wheel 16 disposed in the gear portion 10B.

In the rotation gear wheel 16, a shaft 20 as a motor output shaft is supported rotatably by a cover 18 of the gear portion 10B. Thus, when the motor portion 10A is operated and the rotation shaft 12 rotates, the rotation force is transmitted to rotation gear wheel 16 through the worm gear 14 and the shaft 20 rotates. A pinion 22 is attached on the top end of the shaft 20, and is configured so that it engages with the rack (not shown) of a window regulator. Here, in this embodiment, it is so designed that, when the shaft 20 (pinion 22) rotates from 3 to 3.5 rotations, for instance, the window glass moves for 1 stroke.

On the side opposite to the shaft 20 of the rotation gear wheel 16, the position detector 30 is attached through a gasket 32.

Figure 1:
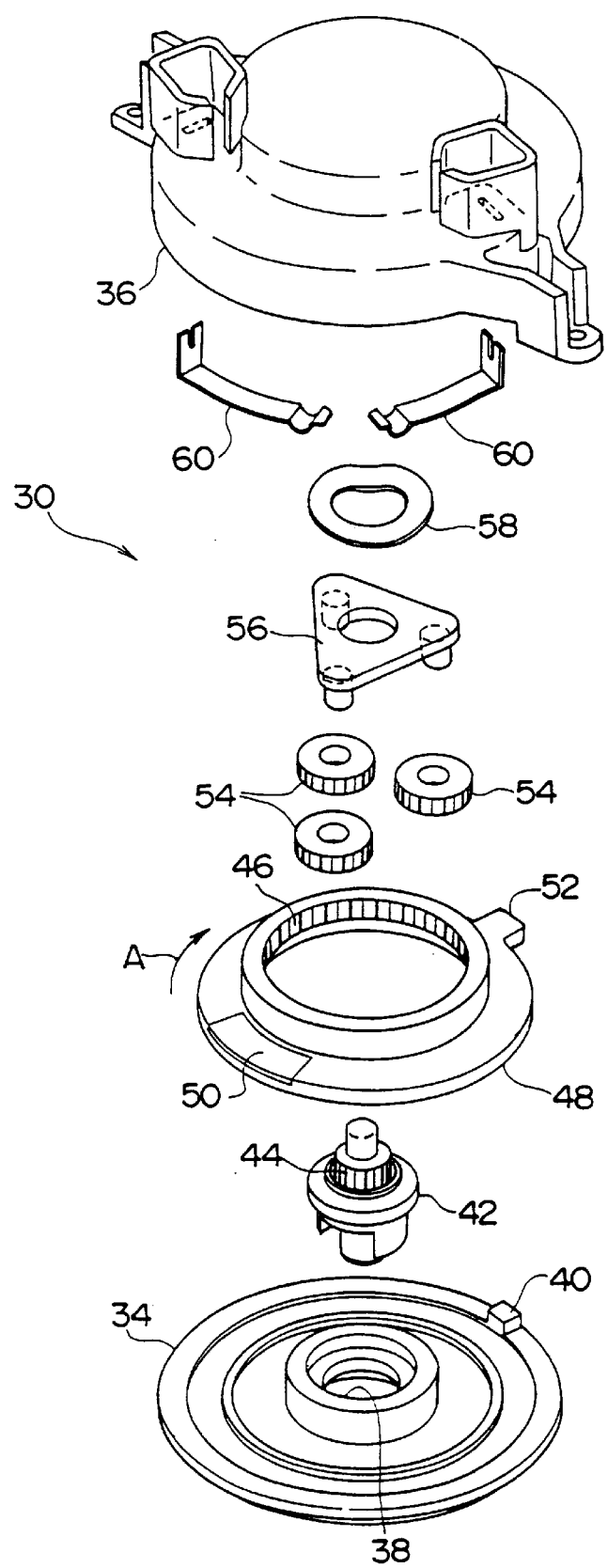
FIG. 1 is a perspective view of a position detector in a disassembled condition in the first embodiment.

As shown in detail in FIG. 1, the position detector 30 is equipped with a base plate 34 and a cover plate 36 and is configured in an approximately cylindrical form by those two. A through hole 38 is formed in the central portion of the base plate 34, and a protrusion 40 is formed to extend in the axial direction at a peripheral portion of the same.

Furthermore, the position detector 30 is equipped with a connection shaft 42. One end of the connection shaft 42 is connected integrally to the shaft 20 of the rotation gear wheel 16 to constantly rotate together with the shaft 20. Furthermore, the other end of the connection shaft 42 protrudes into the inside of the position detector 30 (base plate 34 and cover plate 36) via the through hole 38 formed in the base plate 34. Near the other end of the connection shaft 42, a sun gear 44 constituting a planetary gear train unit is provided, and engages with a planetary gear 54 described later.

On the side of the base plate 34, that is, at the periphery of the connection shaft 42, a ring rear 46 configuring the planetary gear train unit is positioned to oppose a sun gear 44. A flange portion 48 is formed integrally on the end of the side of the base plate 34 of the ring gear 46, and is encased rotatably in the base plate 34. In addition, a move contact 50 is provided in the flange portion 48. The move contact 50 is a conductive plate formed in an arc slope, and is attached so that it is on the approximately equal plane with the flange portion 48. Furthermore, a protruding section 52 is formed on a portion of the periphery of the flange portion 48 to extend therefrom. The protruding section 52 corresponds to the protrusion 40 formed on the above-mentioned base plate 34, and is so configured that the protruding section 52 contacts with the protrusion 40 at the time point when the ring gear 46 (flange portion 48) rotates in the forward direction (arrow A in FIGS. 1, 2 and 4) and arrives at the specified rotation position, and that further rotation of the ring gear 46 in the forward direction is stopped.

In the internal perimeter portion of the ring gear 46, three planetary gears 54 are positioned around the sun gear 44. These planetary gears 54 are supported by a carrier 56 rotatably and are engaged with the ring gear 46 and the sun gear 44. That is, the sun gear 44, the ring gear 46 and the planetary gears 54 configure the planetary gear train unit, and are capable of decelerating the rotation of the connection shaft 42 (that is, shaft 20) to transmit it. This is a configuration wherein, for example, when the revolution of the planetary gear 54 is stopped while the carrier 56 is maintained, the rotation of the connection shaft 42 (that is, shaft 20) can be decelerated and transmitted to the ring gear 46.

In this embodiment, the deceleration ratio of the planetary gear train unit comprised of the sun gear 44, the ring gear 46 and the planetary gears 54 is 4:1, and the unit is so configured that the ring gear 46 will not rotate for more than one rotation while the window glass makes one stroke (while the sun gear 44 makes 3 to 3.5 rotations).

The deceleration ratio of the planetary gear train unit is not limited to 4:1, but can be set to an arbitrary value as desired.

A wave washer 58 constituting a clutch mechanism is positioned between the cover plate 36 which covers the planetary gear train unit comprised of the sun gear 44, the ring rear 46 and the planetary gear 54 configured as above and the carrier 56. The wave washer 58 constantly presses the carrier 56, and thus, normally the rotation of the carrier 56 is stopped and the planetary gear 54 is maintained in a state that the revolution is prevented. The wave washer 58 is configured so that, when the protruding section 52 of the flange portion 48 of the ring gear 46 contacts with the protrusion 40 and further rotation of the ring gear 46 in the forward direction is stopped, the forward direction rotation force of the sun gear 44 surpassing the pressing force (maintaining force) of the carrier 56 acts and the wave washer 58 releases the maintenance of the carrier 56 to allow the revolution of the planetary gear 54. That is, after the protruding section 52 of the flange portion 48 contacts the protrusion 40, the wave washer 58 can shut off the transmission of the forward direction rotation force from the sun gear 44 (shaft 20) to the ring gear 46. Thus, in the case wherein the protruding section 52 contacts the protrusion 40 and the rotation of the ring gear 46 is stopped, when the sun gear 44 (shaft 20) rotates in the forward direction (the direction to turn the ring gear 46 in the forward direction), only the planetary gears 54 revolve.

One set of fixed contacts 60 is attached to the cover plate 36. The fixed contacts 60 are a set of contact plates possessing elasticity, and are so configured that one end is fixed to the cover plate 36 and each top end extends toward a flange portion 48 of the ring gear 46 to elastically contact the flange portion 48, and contacts a move contact 50 at the specified rotation position of the ring gear 46. Those fixed contacts 60 and the move contact 50 are electrically connected to the control circuit of the power window device, and are so configured that, when the move contact 50 contacts the set of fixed contacts 60 to be in a conducting state, the rotation position of the ring gear 46, that is, the rotation position of the sun gear 44 or the shaft 20 can be detected. These contacts are used in the rotation control of the motor 10 described later.

Figure 2:
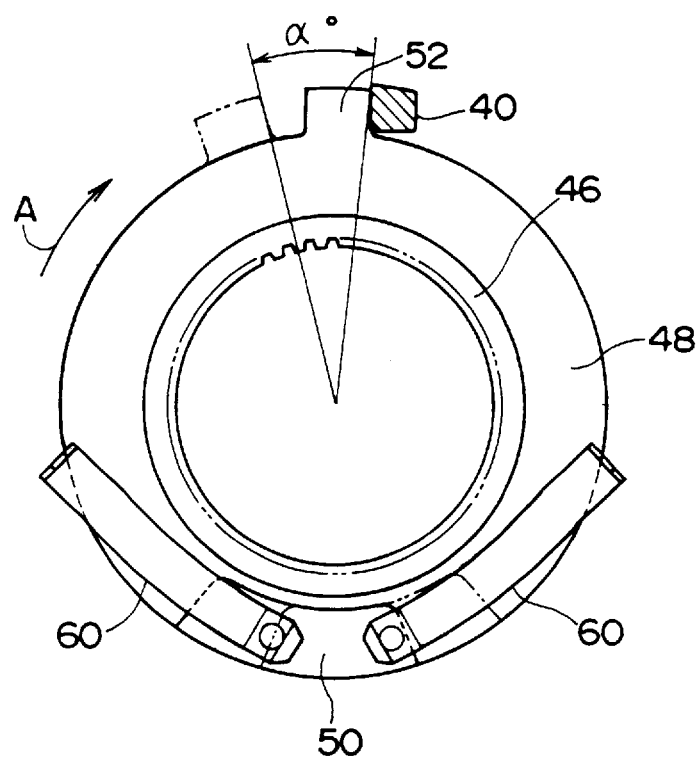
FIG. 2 is a plan illustrating a corresponding relationship between a fixed contact and a move contact and a protruding section and a protrusion of the position detector in the first embodiment of the present invention.

In this embodiment, as explicitly shown in detail in FIG. 2 for example, at the point when the window glass has moved to 4 mm downward from the upper stop position, the protruding section 52 reaches a position a degrees upstream from the rotation angle where it contacts with protrusion 40, and at this point, the move contact 50 contacts the set of fixed contacts 60 and becomes conducting. Furthermore, the dimensions of each portion is so determined that the conduction state (state in which the move contact 50 is in contact with the pair of fixed contacts 60) can be maintained until the protruding section 52 contacts with the protrusion 40.

On the contrary, it may be so configured that, when the window glass has moved to 4 mm downward from the upper stop position and the protruding section 52 reaches the position a degrees upstream from the rotation angle where it contacts with the protrusion 40, the move contact 50 contacts with a set of the fixed contacts 60 and becomes non-conducting for the position detection. Furthermore, after the conduction state or the non-conduction state are achieved as mentioned above, it is not always necessary to electrically maintain such conduction state and non-conduction state. It can thus be configured so that reaching the specified rotation position can be determined by detecting a trigger signal generated from the contact between the move contact 50 and a set of the fixed contacts 60.

Figure 6:
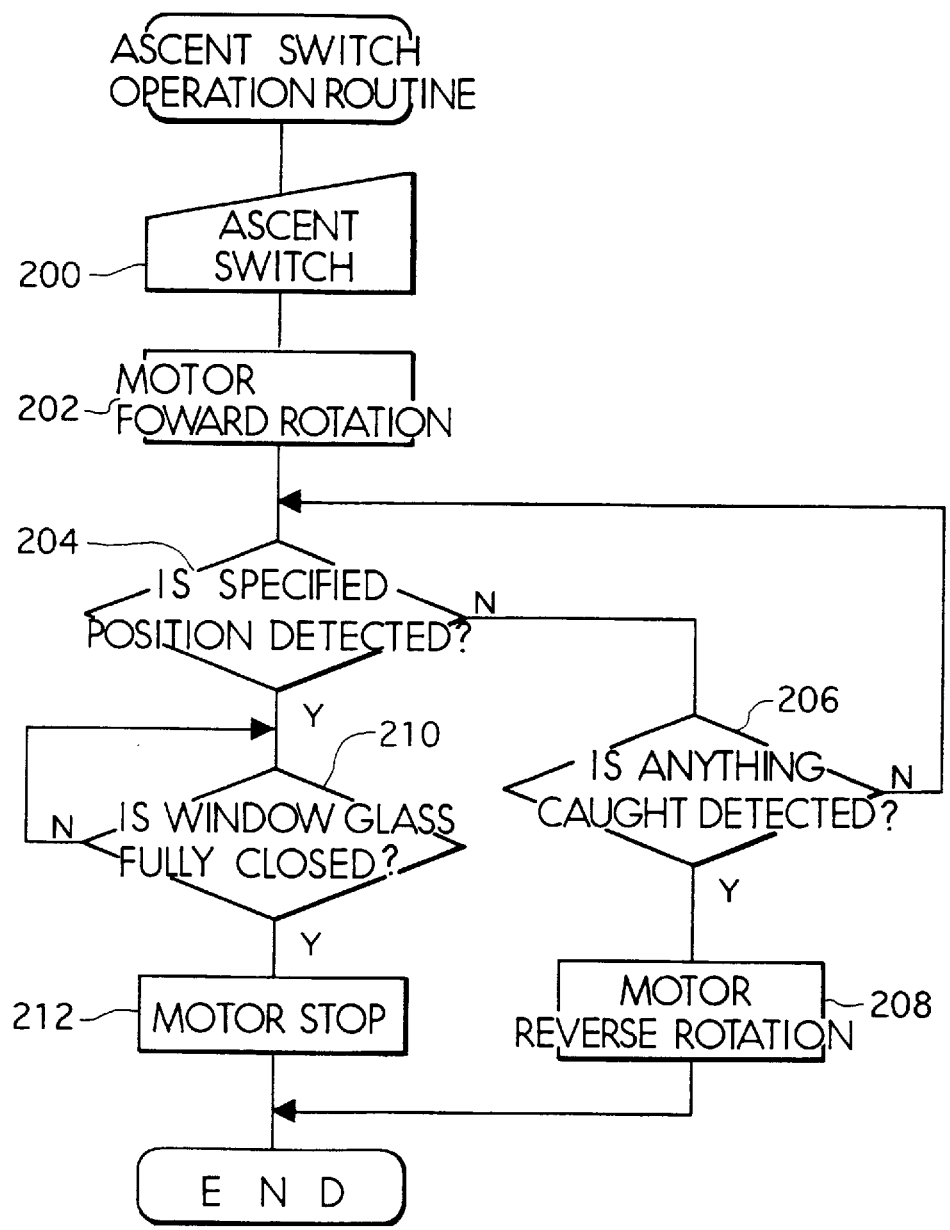
FIG. 6 is a flow chart illustrating the control when a window glass ascends by the operation of an ascent switch of the power window device applied with the first embodiment of the present invention.

The operation of this embodiment is described according to the flow chart shown in FIG. 6 with reference to the case in which the window glass moves upward in response to the operation of an ascent switch of the power window device.

In the motor 10 and the position detector 30 mentioned above, when the ascent switch of the power window device is operated in a step 200, the motor 10 rotates and the shaft 20 rotates at a step 202, and thus the window regulator is actuated and the window glass is raised.

Normally (while the window glass is ascending), a carrier 56 is held pressed by a wave washer 58, and the revolution of the planetary gear 54 is stopped. Thus, following the rotation of the shaft 20, the rotation force of the connection shaft 42 (that is, the sun gear 44) is decelerated through the planetary gear 54 and transmitted to the ring gear 46. Thus, the ring gear 46 gradually starts rotating in the forward direction.

Next, in a step 204, whether or not the motor 10 reaches a specified rotation position, that is, whether or not the window glass reaches the specified position (4 mm below the upper stop position) is detected by the position detector 30.

That is, in the position detector 30, following the rotation of the shaft 20, the rotation force of the connection shaft 42 (that is, the sun gear 44) is decelerated through the planetary gear 54 and transmitted to the ring gear 46, and then the ring gear 46 gradually starts rotating in the forward direction. However, provided that the window glass does not reach the position 4 mm below the upper stop position, the protruding section 52 is greatly separated from the protrusion 40, and the move contact 50 is away from a pair of fixed contacts 60 and is in a non-conduction state. Thus, the rotation position of the shaft 20 (the fact that the window glass does not reach the position 4 mm below the upper stop position) is detected. In this case, with the motor 10 being actuated, the process moves on to a step 206 and whether or not the window catches something is determined based on a lock current of the motor 10 or the like. When catching something is detected, the motor 10 is rotated in a step 208 in the reverse direction, and the window glass descends. Provided that it is determined in the step 206 that nothing is caught, the process returns to the step 204.

In the step 204, when the window glass reaches the position 4 mm below the upper stop position, the protruding section 52 reaches a position a degrees upstream from the rotation angle where it contacts the protrusion 40. Furthermore, at this point, the move contact 50 contacts a pair of fixed contacts 60 and is in conducting state, and thus the rotation position (the fact that the window glass reaches the position 4 mm below the upper stop position) of the shaft 20 is detected.

After detecting the rotation position of the shaft 20 of the motor 10, that is, the fact that the window glass reaches the specified position, the process moves to a step 210 while the motor 10 is actuated. At this time, although a relative contact position for the ring gear 50 and a pair of fixed contacts 60 is changed by the rotation of the ring gear 46, the conducting state (the state wherein move contact 50 contacts the pair of fixed contacts 60) is maintained.

In the step 210, whether or not the window glass is fully closed is determined based on the lock current of the motor 10 or the like. When the full closure of the window glass is detected, the motor 10 is stopped in a step 212 and the process is completed.

Thus, in the position detector 30, by the move contact 50 rotating with the ring gear 46 and the pair of fixed contacts 60, the rotation position of the shaft 20, that is, the position of the window glass (whether or not it reaches the position 4 mm below the upper stop position) is accurately detected.

Furthermore, in the position detector 30, by sufficiently rotating the shaft 20 of the motor 10 in the forward direction once at the time of assembling to the vehicle, it is automatically set to an initial state in which the move contact 50 contacts the fixed contacts 60.

That is, when the shaft 20 of the motor 10 is sufficiently rotated in the forward direction once at the time of assembling to the vehicle, the protruding section 52 of the flange portion 48 of the ring gear 46 contacts the protrusion 40 so that any further rotation of the ring gear 46 in the forward direction is stopped. When the shaft 20 further rotates under this condition, the rotation force of the sun gear 44 surpassing the pressing force (a holding force) of the carrier 56 acts, and the wave washer 58 cancels the holding of the carrier 56 and the revolution of the planetary gear 54 can be carried out. That is, since after the protruding section 52 of the flange portion 48 contacts the protrusion 40, the wave washer 58 can shut off the transmission of the rotation force in the forward direction from the sun gear 44 (the shaft 20) to the ring gear 46, in the case wherein the protruding section 52 contacts the protrusion 40 and the rotation of the ring gear 46 is stopped. When the sun gear 44 (the shaft 20) rotates in the forward direction (the direction in which the ring gear 46 is to move in the forward direction), only the planetary gear 54 revolves. Thus, after the protruding section 52 contacts the protrusion 40 and the move contacts 50 contacts the fixed contact 60, the ring gear 46 does not move even though the shaft 20 of the motor 10 rotates in the forward direction, and the contact state in which the move contacts 50 contacts the fixed contact 60 is maintained. That is, by sufficiently rotating the shaft 20 of the motor 10 in the forward direction once, the protruding section 52 contacts the protrusion 40, and it is automatically set to the initial state in which the move contact 50 contacts the fixed contacts 60.

In other words, in the position detector 30, the position being away from the fully closed position of the window glass (upper maximum move limit) with a fixed distance (4 mm in this embodiment) can be mechanically stored regardless of whether or not the window glass reaches the fully closed position (upper maximum move limit), and thus the move control of the window glass can be accurately carried out without fail. For example, the rotation number of the armature is detected and the move position of the window glass is detected in the past. Thus, it is configured to reset with the fully closed position of the window glass as the reference. However, provided that the window glass stops before reaching the true upper maximum move limit for reasons such as a lowered power supply voltage, an increased friction between the window glass and the window frame or the like, the unit resets with this false stop position as the fully closed position of the window glass. Thus, in this case, errors become extremely large because the drive control of the motor is carried out with the false fully closed position of the window glass as the reference. On the other hand, in the position detector 30, even though the window glass stops before reaching the true fully closed position (upper maximum move limit), this is accurately detected when the window glass later passes the position 4 mm away from the fully closed position, and the move control of the window glass can be accurately carried out without fail. In particular, wire-type window regulators, errors in the move position control due to a wire distortion are large. However, by using the position detector 30, errors due to the wire distortion can be absorbed and a precise control can be carried out.

Thus, in the position detector 30, by sufficiently rotating the shaft 20 of the motor 10 in the forward direction once at the time of assembling to the vehicle, the protruding section 52 contacts the protrusion 40 and it is automatically set to the initial state which the move contact 50 contacts the fixed contacts 60. The initial position can be set easily without cumbersome positional adjustment at the time of assembling and cumbersome resetting after the assembling work, and the move control of the window glass can be accurately carried out without fail.

This first embodiment is configured so that the wave washer 58 configuring a clutch mechanism is disposed between the cover plate 36 covering the planetary gear unit and the carrier 56, and the carrier 56 is pressed by the wave washer 58 and normally the rotation of the carrier 56 and the revolution of the planetary gears 54 is stopped. However, the clutch mechanism is not limited to this configuration.

Figure 7:
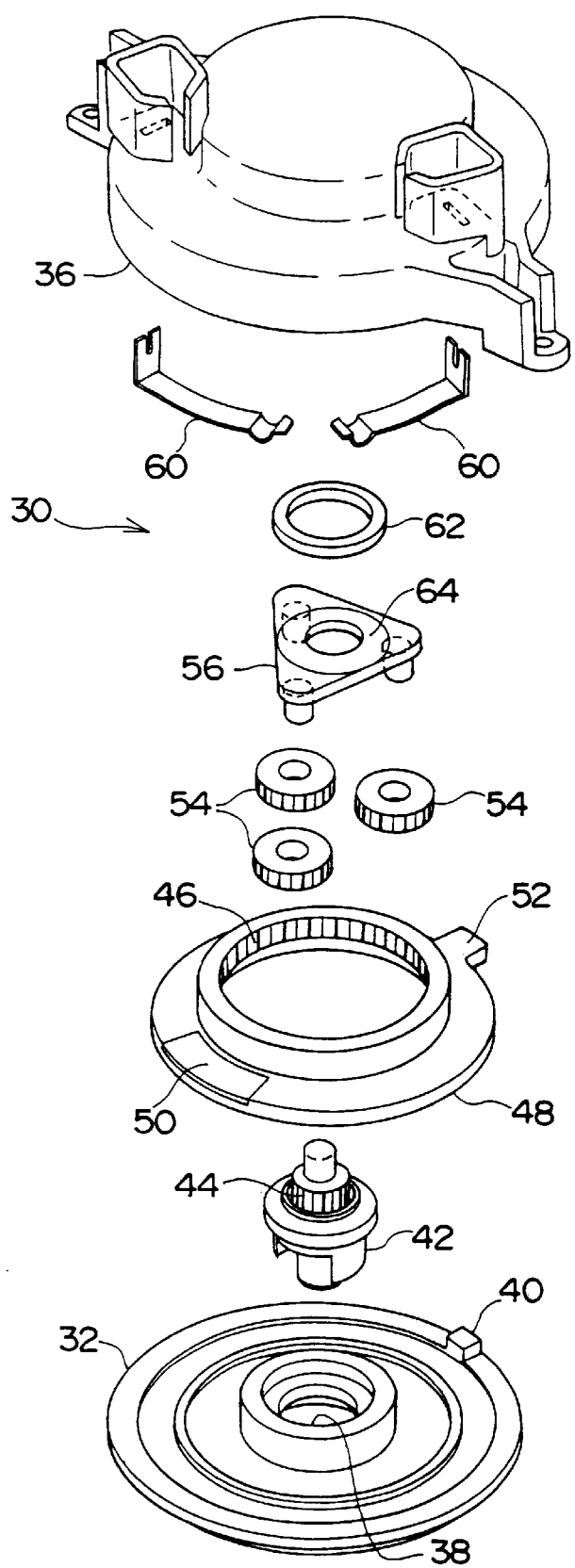
FIG. 7 is a perspective view illustrating the modification of the position detector, under the disassembled condition, in the first embodiment of the present invention.

In FIG. 7, for example, a ring type magnet 62 is fixed on the cover plate 36 in place of the wave washer 58, and a copper plate 64 can be attached to the carrier 56 (the carrier 56 itself can be formed of a magnetic body). Even in such case, normally the rotation of the carrier 56 is stopped by the magnet 62, and the planetary gear 54 is maintained under the state wherein its revolution is stopped. When the protruding section 52 of the flange portion 48 of the ring gear 46 contacts the protrusion 40 and a further forward direction rotation of the ring gear 46 is stopped, the magnet 62 cancels to its hold on the carrier 56 by which the action of the rotation force in the forward direction of the sun gear 44 surpassing the holding force of the carrier 56 and the revolution of the planetary gear 54 can be carried out. Thus, when the sun gear 44 rotates in the forward direction (the direction which the ring gear 46 is rotated in the forward direction) after the protruding section 52 of the flange portion 48 contacts the protrusion 40, only the planetary gear 54 revolves and the transmission of the rotation force in the forward direction from the sun gear 44 to the ring gear 46 can be shut off. Thus, by sufficiently rotating the shaft 20 of the motor 10 once at the time of assembling to the vehicle, and the protruding section 52 contacts the protrusion 45 and it is automatically set to the initial state in which the move contact 50 contacts the fixed contacts 60. The initial position is set easily without cumbersome positional adjustment at the time of assembling and cumbersome resetting after the assembling work.

Figure 8:
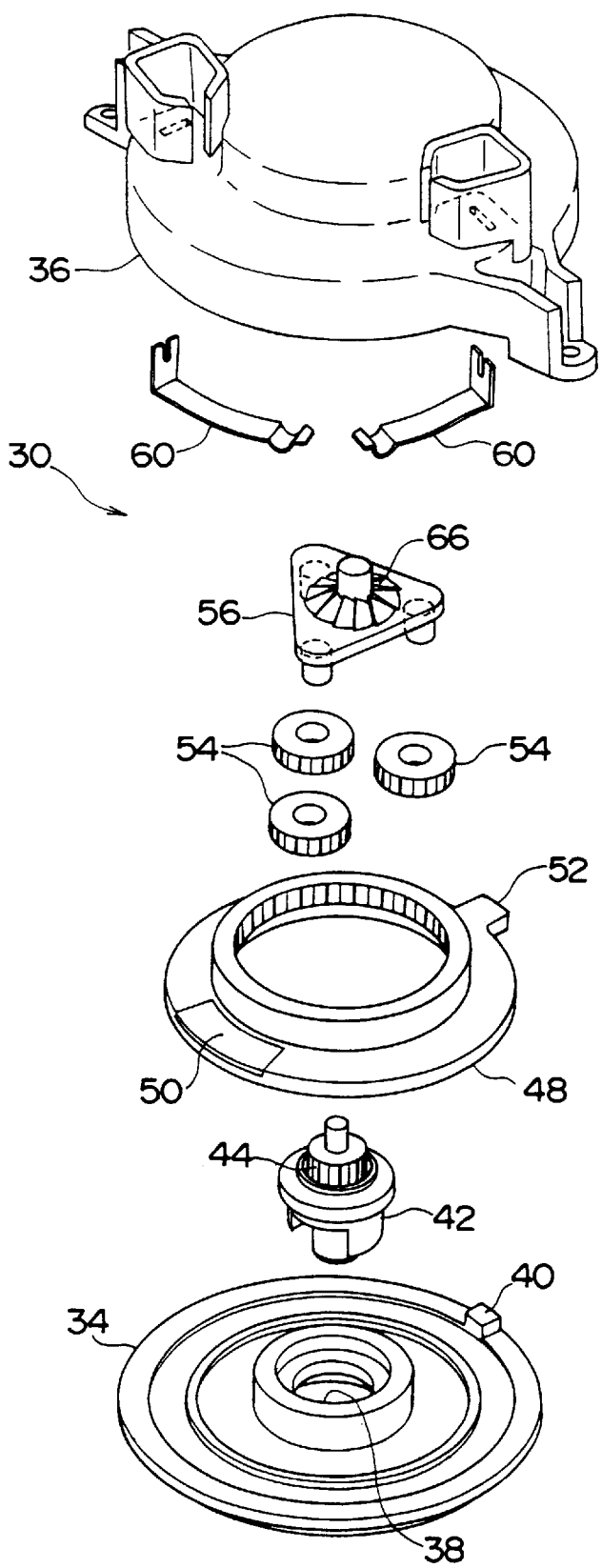
FIG. 8 is a perspective view illustrating the other modification of the position detector, under the disassembled condition, in the first embodiment of the present invention.

As another example in FIG. 8, a rachet mechanism can be composed in place of the wave washer 58 by a rachet portion 66 with continued notches installed on the carrier 56 and the back surface of the cover plate 36. Even in this case, normally the rachet portion 66 engages with the back surface of the cover plate 36 so that the rotation of the carrier 56 is stopped and the planetary gears 54 are maintained under the state in which the revolution is stopped. Thus, when the protruding section 52 of the flange portion 48 of the ring gear 46 contacts the protrusion 40, and the further forward direction rotation of the ring gear 46 is stopped, an engagement between the rachet portion 66 and the back surface of the cover plate 36 is canceled by the action of the rotation force in the forward direction of the sun gear 44 surpassing the holding force of the carrier 56 and the revolution of the planetary gear 54 can be carried out. Thus, when the sun gear 44 rotates in the forward direction after the protruding section 52 of the flange portion 48 contacts the protrusion 40, only the planetary gears 54 revolve and the transmission of the rotation force in the forward direction from the sun gear 44 to the ring gear 46 can be intercepted. Thus, by sufficiently rotating the shaft 20 of the motor 10 once at the time of assembling to the vehicle, the protruding section 52 contacts the protrusion 45 and it is automatically set to the initial state which the motor 50 contacts the fixed contact 60. The initial position is set easily without cumbersome positional adjustment at the time of assembling and cumbersome resetting after the assembling work.

Another embodiment of the present invention will be described. Parts used in this embodiment are basically identical to the ones in the first embodiment and have the same reference numerals so that the description thereof will be omitted.

(Second embodiment)

Figure 9:
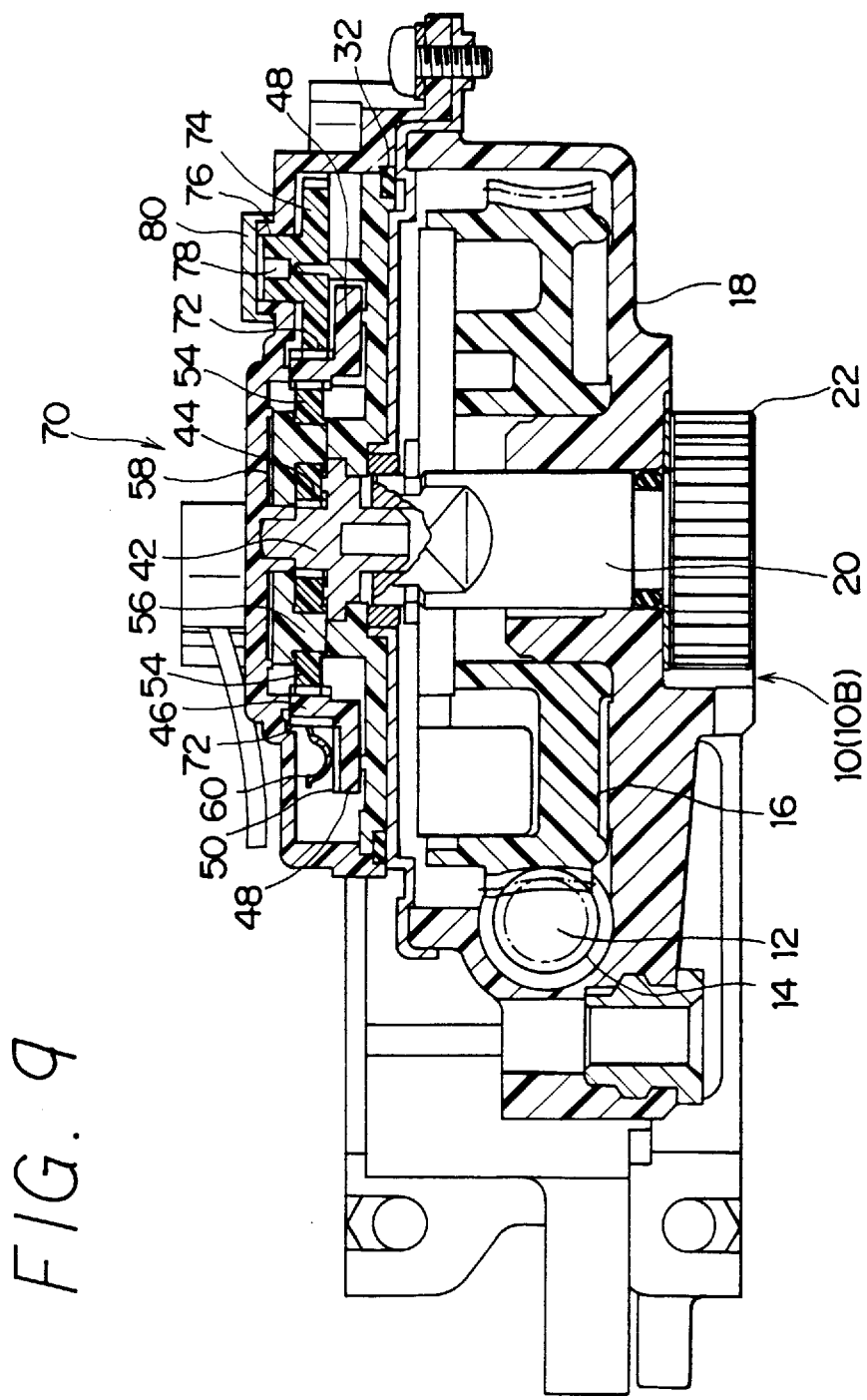
FIG. 9 is a cross-sectional view of the position detector in the first embodiment of the present invention and the motor the of power window device applied with the position detector.
Figure 10:
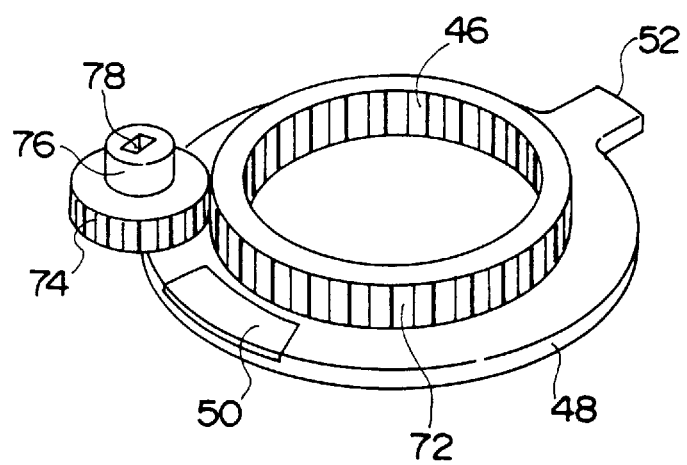
FIG. 10 is a perspective view illustrating a ring gear and a supplemental gear of the position detector in the second embodiment of the present invention.

FIG. 9 shows the position detector 70 according to the second embodiment of the present invention and a cross-sectional view of the motor 10 for the power window device wherein the position detector 70 is applied. In addition, FIG. 10 shows the perspective view of major parts of the position detector 70.

In the position detector 70, a gear tooth portion 72 is formed on a wall in a side of an outer circumference of the ring gear 46 comprising the planetary gear unit, furthermore, a supplemental gear 74 as the correction means is disposed on the side of the ring gear 46. The supplemental gear 74 engages with the gear tooth portion 72 of the ring gear 46. An operation groove 78 formed on a shaft portion 76 of the supplemental gear 74 is exposed to the exterior of the cover plate 36. Furthermore, the shaft portion 76 of the supplemental gear 74 exposed to the exterior is normally covered with a rubber cap 80. Thus, the supplemental gear 74 can be rotated by removing the rubber cap 80 and actuating the shaft portion 76 (the operation groove 78) from the exterior. When the supplemental gear 74 rotates, the ring gear 46 engaged with the supplemental gear 74 is rotated by force.

In the position detector 70 according to the second embodiment, since the ring gear 46 can be operated from the exterior by the supplemental gear 74, the ring gear 46 can be rotated by force regardless of the rotation position of the shaft 20. The protruding section 52 contacts the protrusion 40 and it is automatically set to the initial state in which the move contact 50 contacts the fixed contacts 60.

Therefore, when the motor 10 and the position detector 70 are used in the power window device having the catch prevention mechanism, for example, the initial state can be set when the motor 10 and the position detector 70 are attached to the vehicle by the operation of the supplemental gear 74 and without actuating the motor 10. Therefore, the initial position can be set easily without cumbersome positional adjustment at the time of assembling and cumbersome resetting after the assembling work.

In the second embodiment, a shape of the operation groove 78 formed in the shaft portion 76 of the supplemental gear 74 and a gear tooth number of the gear tooth portion 72 can be set appropriately with necessity.

(Third embodiment)

Figure 11:
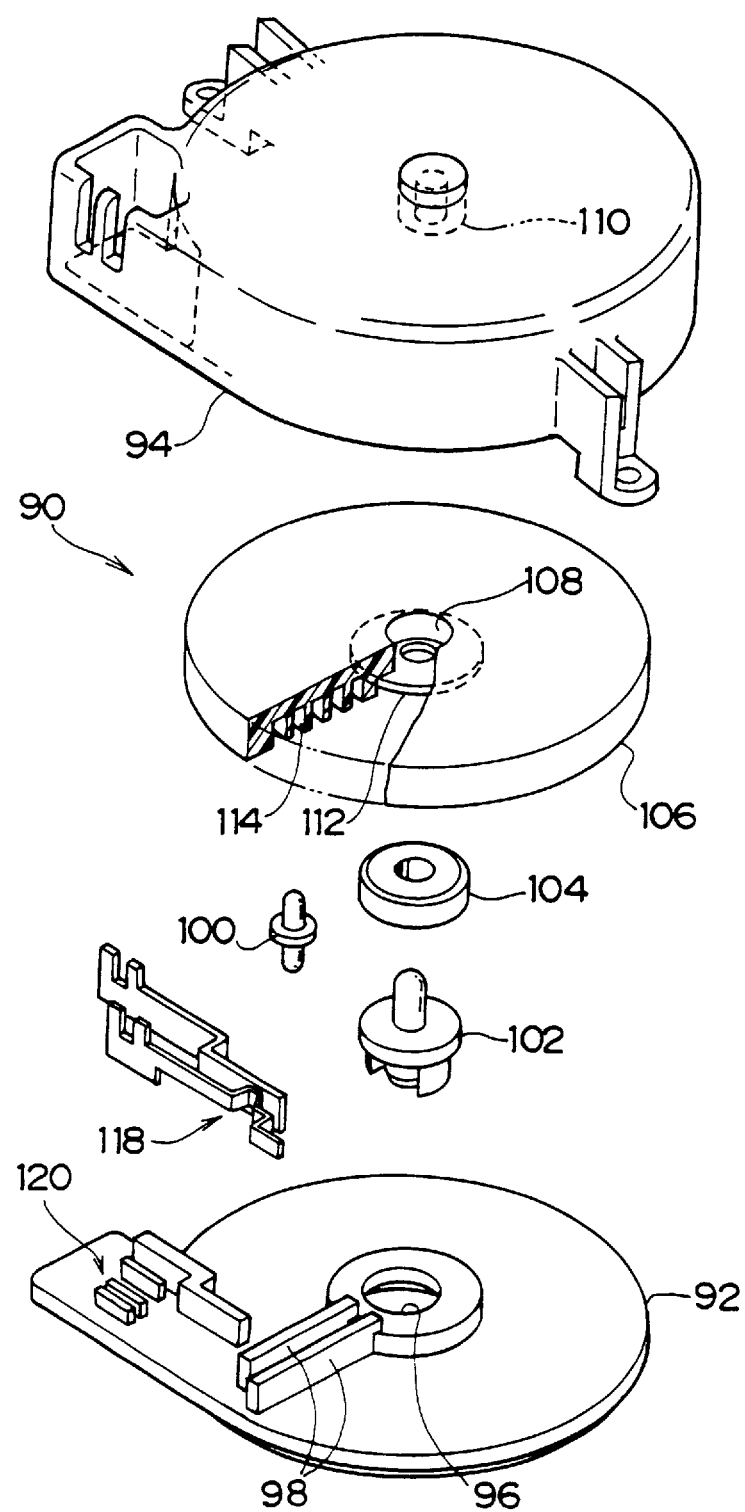
FIG. 11 is a perspective view of the position detector, in the disassembled condition, in the third embodiment of the present invention.
Figure 13:
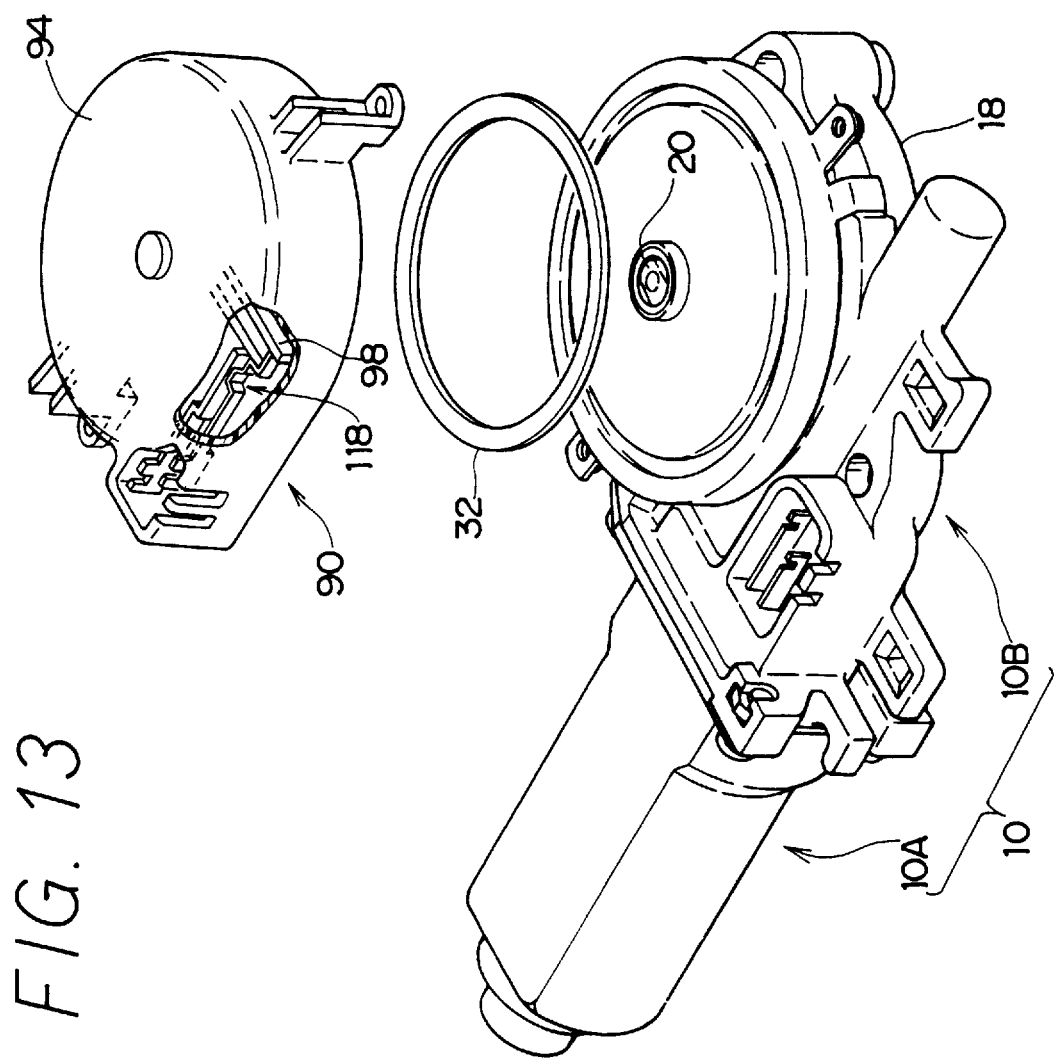
FIG. 13 is a general disassembled perspective view of the motor for the power window device applied with the third embodiment of the present invention.
Figure 14:
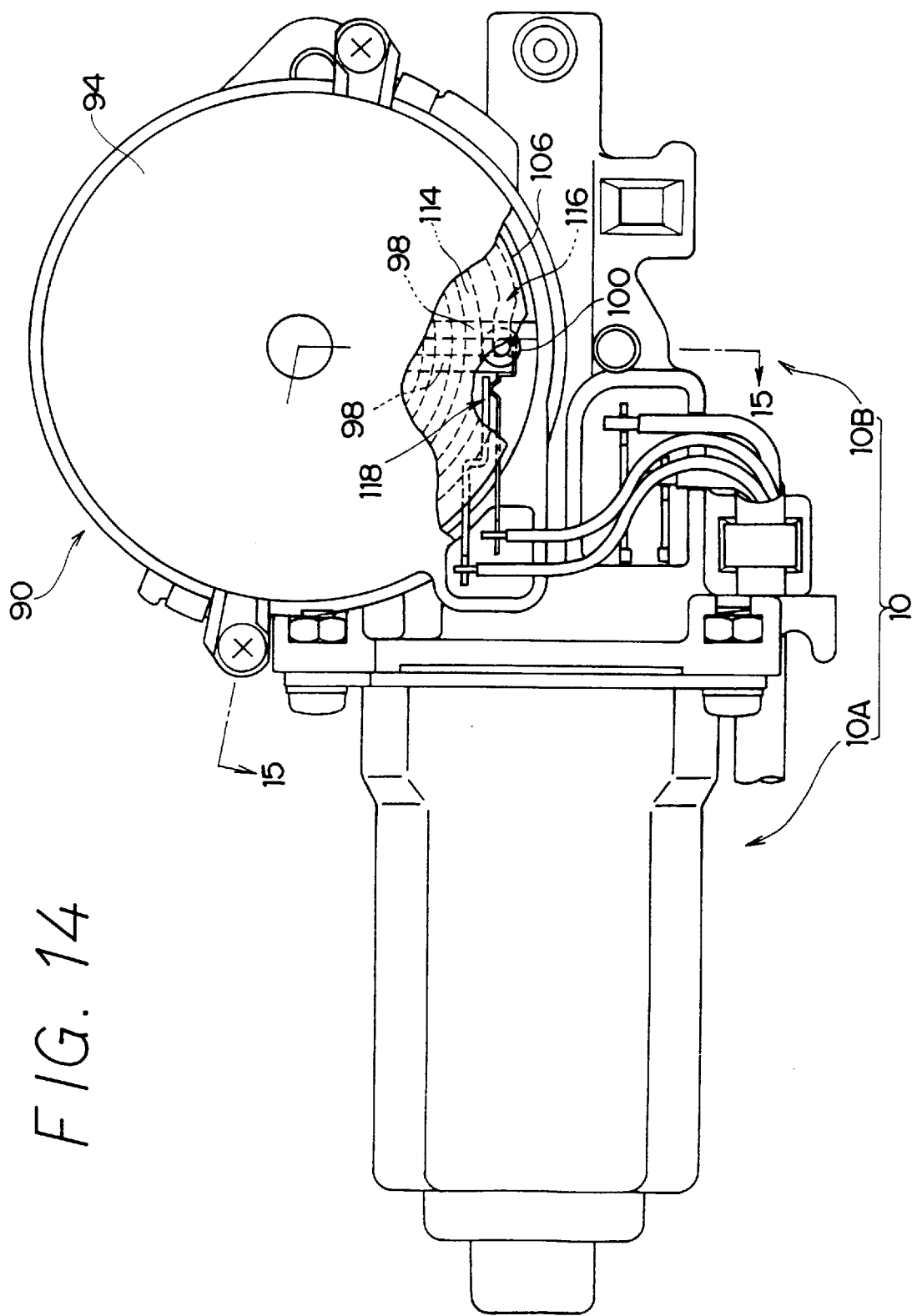
FIG. 14 is a partially cut-away plan view of the motor for the power window device applied with the third embodiment of the present invention.
Figure 15:
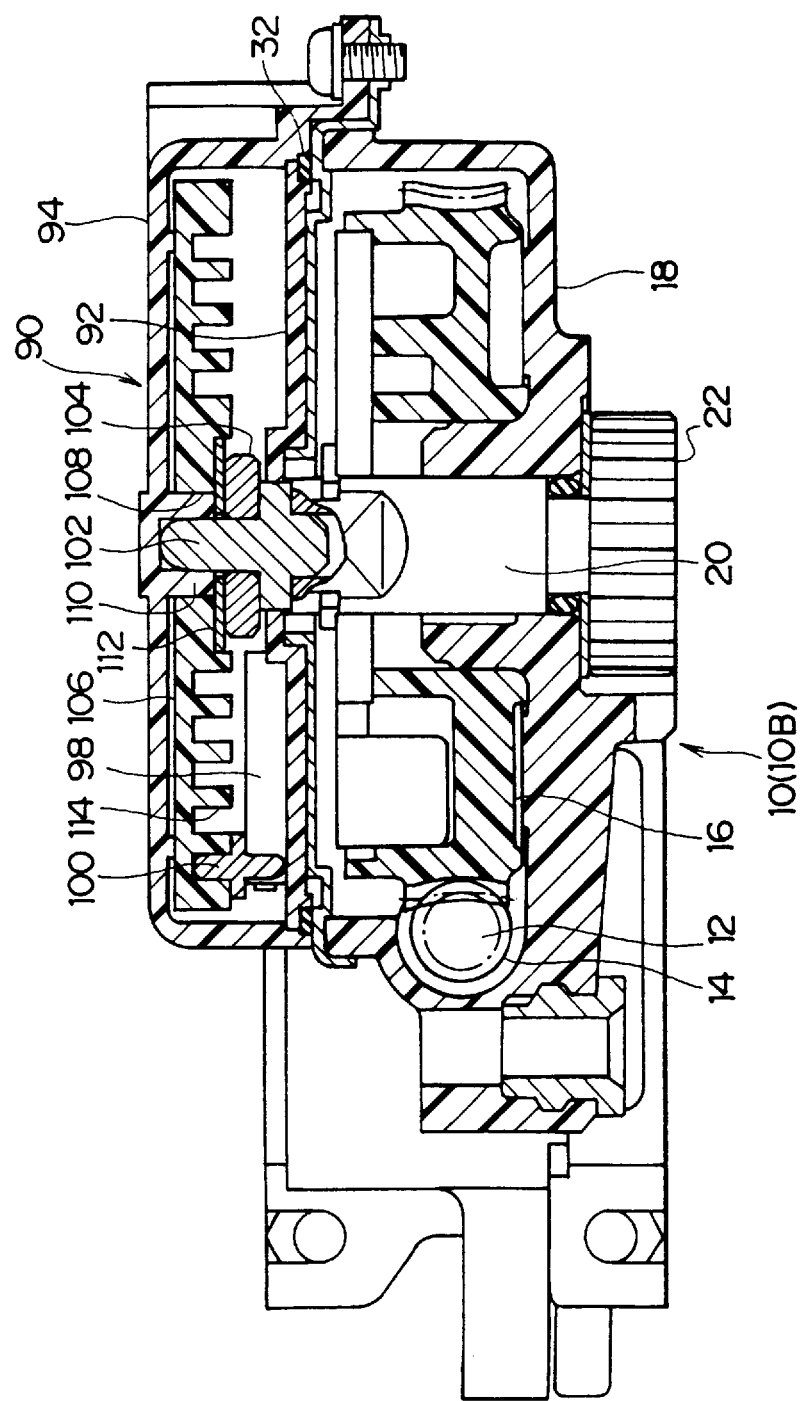
FIG. 15 is a cross-sectional view taken along the line 15—15 in FIG. 14 of the motor for the power window device applied with the third embodiment of the present invention.

FIG. 11 shows a perspective view of the position detector 90 in a disassembled condition in the third embodiment of the present invention. FIG. 13 shows an overall perspective view of the motor 10 for the power window device applied with the position detector 90. FIG. 14 shows a plan view partially cutting away the motor 10 and FIG. 15 shows a cross-sectional view of the motor 10 taken along the line 15—15 in FIG. 14.

The position detector 90 mounted on the motor 10 is equipped with a base plate 92 and a cover plate 94 and formed into an approximately cylindrical form by the two plates. A through hole 96 is formed in the central portion of the base plate 92 and a pair of guide walls 98 opposing thereto project in the radial direction. One end of the move pins 100 is in guide walls 98 and can slide in the diameter direction of the base plate 92 along the guide walls 98.

Furthermore, the position detector 90 is equipped with a connection shaft 102 and one end thereof is connected as a single unit to the shaft 20 of the rotation gear wheel 16 so that it constantly rotates together with the shaft 20. The other end of the connection shaft 102 projects into the inside of the position detector 90 (the base plate 92 and the cover plate 94) through the through hole 96 formed on the base plate 92. A ring type magnet 104 comprising a clutch mechanism is fixed as a single unit on the other end of the connection shaft 102 and it constantly rotates together with the connection shaft 102.

On the back side of the cover plate 94, the rotation plate 106 is disposed in opposing relation to the magnet 104. The supporting hole 108 is formed at the central portion of the rotation plate 106 and the supporting hole 108 enters and is supported at the support protrusion 110 of the cover plate 94 so that it can rotate. In the periphery of the supporting hole 108 on the back side of the rotation plate 106, the ring plate 112 comprising a clutch mechanism is adhered in opposing relation to the magnet 104. The ring plate 112 is a magnetic body and constantly receives a magnetic force from the magnet 104. Thus, normally the ring plate 112, that is, the rotation plate 106 rotates together with the connection shaft 102 by the attraction force (the magnetic force) of the magnet 104.

Figure 12:
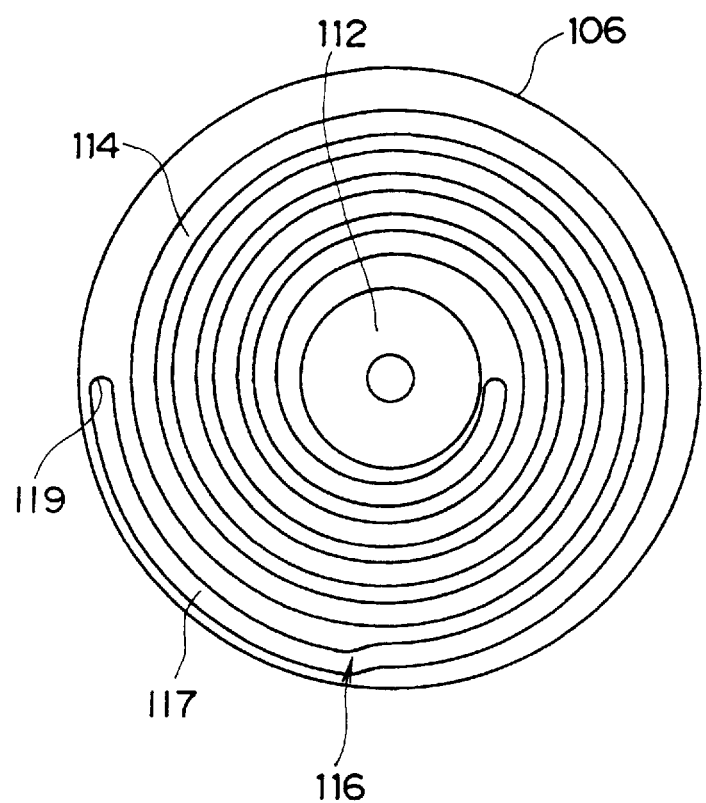
FIG. 12 is a back view illustrating a guide groove of a the rotation plate of the position detector in the third embodiment of the present invention.

Furthermore, a guide groove 114 is formed on the back side of the rotation plate 106. As shown in FIG. 12, the guide groove 114 is formed continuously from the center of the radius direction to the outside of the radius direction of the rotation plate 106. On the outermost portion of the guide groove 114, a curvature portion 116 bending largely to the outside of the radius direction is formed. Furthermore, an extension portion 117 is formed toward the perimeter direction from the curvature portion 116 and the end of the extension portion 117 is an extension edge 119. The other end of a move pin 100 enters in the guide groove 114 so that it can move therein. Thus, the move pin 100 capable of moving only in the radial direction moves therein along the guide wall 98 by guiding in a spiral manner by the guide groove 114 when the rotation plate 106 rotates. Further, when the move pin 100 reaches the curvature portion 116, it largely moves to the outside of the radius direction by a slight rotation of the rotation plate 106. Moreover, after the move pin 100 reaches the curvature portion 116 of the guide groove 114 and largely moves to the outside of the radius direction, the rotation plate 106 continues to rotate for the length of the radius direction of the extension portion 117. In the condition that an extension end portion 119 contacts the move pin 100 and the perimeter direction rotation of the rotation plate 106 is stopped, the actuation of the rotation force in the forward direction of the connection shaft 102 surpasses the holding force (the magnetic force) of the ring plate 112 by the magnet 104 so that the holding of the ring plate 112 by the magnet 104 is canceled. Also, the transmission of the rotation force in the forward direction from the connection shaft 102 to the rotation plate 106 is shut off (that is, the rotation plate 106 does not move and only the connection shaft 102 rotates).

In the third embodiment, the guide groove 114 of the rotation plate 106 is formed for more than 3 laps and the move pin 100 can move freely without contacting the inner end of the guide groove 114 while the window glass strokes one time (the shaft 20, that is, the connection shaft 102 rotates from 3 to 3.5 times.)

Furthermore, a limit switch 118 is disposed on the outer end portion in the radius direction of the guide wall 98 formed at the base plate 92. The limit switch 118 is a pair of contact plates having elasticity and one end thereof is fixed to a fixed portion 120 formed at the base plate 92 and the tip is disposed at the outer end portion in the radius direction of the guide wall 98. The limit switch 118 is electrically connected to the control circuit of the power window device and is in a non-conduction state by being compressed by the move pin 100 when the move pin 100 reaches the curvature portion 116 so that the limit switch 118 is used in a rotation control of the motor 10 described later.

In the third embodiment, when the window glass ascends and the window glass reaches a position 4 mm below the upper stop position, the move pin 100 reaches the curvature portion 116 of the guide groove 114, largely moves to the outside in the radial direction and compresses the limit switch 118 so that the limit switch 118 is in the non-conduction state. Furthermore, the non-conduction state is maintained until the move pin 100 contacts the extension end portion 119 of the spiral extension portion 117 of the guide groove 114.

The limit switch 118 can be in the non-conduction state by being compressed by the move pin 100 reaching the curvature portion 116.

The effects of the third embodiment is described by an example in which the window glass ascends by the operation of the ascent switch of the power window device.

In the motor 10 and the position detector 90 described above, when the ascent switch of the power window device is actuated, the shaft 20 rotates by the actuation of the motor 10 so that the window regulator is actuated and the window glass ascends.

In the position detector 90, normally (during the ascent of the window glass), the ring plate 112, that is, the rotation plate 106 is held as a single unit with the connection shaft 102 by the magnetic force of the magnet 104. Thus, following the rotation of shaft 20, the rotation force of the connection shaft 102 is transmitted and the rotation plate 106 gradually starts rotating together with the connection shaft 102.

Although the rotation plate 106 gradually starts rotating with the ascent of the window glass, when the window glass does not reach a position 4 mm below the upper stop position, the move pin 100 being guided by the guide wall 98 and the guide groove 114 is away from the curvature portion 116 (that is limit switch 118) so that the limit switch 118 is in a conduction state. Thus, the rotation position of the shaft 20 (the fact that the window glass does not reach the position 4 mm below upper stop end position) is detected.

When the window glass reaches the position 4 mm below the upper stop end position, the move pin 100 reaches the curvature portion 116 and compresses the limit switch 118 so that the limit switch 118 is in a non-conduction state. Thus, the rotation position of the shaft 20 (the fact that the window glass reaches the position 4 mm below upper stop end position) is detected.

After the move pin 100 compresses the limit switch 118 and the limit switch 118 is in a conduction state and the shaft 20 reaching the specified rotation position, that is, the window glass reaching the specified position is detected. The non-conduction state of the limit switch 118 is maintained and the rotation of the motor 10 continues until the window glass is fully closed.

Thus, in position detector 90, the rotation position of the shaft 20, that is, the position of the window glass (whether or not it reaches the position 4 mm below the upper stop position) can be accurately detected by the move pin 100 moving with the rotation of the rotation plate 106 and the limit switch 118.

Furthermore, in the position detector 90, by sufficiently rotating the shaft 20 of the motor 10 in the forward direction once at the time of assembling to the vehicle, the move pin 100 compresses the limit switch 118 and the limit switch 118 is in a non-conduction state. The initial state which the extension end portion 119 of the guide groove 114 contacts the move pin 100 can be set automatically.

That is, by sufficiently rotating the shaft 20 of the motor 10 in the forward direction once at the time of assembling to the vehicle, the move pin 100 compresses the limit switch 118 and the limit switch 118 is in a non-conduction state and the move to the outside of the radius direction is stopped. Then, the extension end portion 119 of the guide groove 114 contacts the move pin 100, and the further rotation of the rotation plate 106 is stopped. When the shaft 20 is further rotated under the condition, the rotation force in the forward direction of the connection shaft 102 surpassing the holding force (the magnetic force) of the ring plate 112 by the magnet 104 is actuated so that the holding of the ring plate 112 by the magnet 104 is canceled. Thus, the transmission of the rotation force in the forward direction from the connection shaft 102 to the rotation plate 106 is shut off, and thus the rotation plate 106 does not move and only the connection shaft 102 rotates. That is, after the move pin 100 reaches the bend portion 116 and presses the limit switch 118, the extension end portion 119 of the guide groove 114 contacts the move pin 100, even though the shaft 20 of the motor 10 rotates in the forward direction, the rotation plate 106 does not move and the move pin 100 remains to maintain its pressure on the limit switch 118. Thus, by sufficiently rotating the shaft 20 of the motor 10 in the forward direction once, the limit switch 118 is in a non-conduction state, and it is automatically set to the initial state which the extension end portion 119 of the guide groove 114 contacts the move pin 100.

In other words, in the position detector 90, the position being away from the fully closed position of the window glass (upper maximum move limit) with a fixed distance (4 mm in this embodiment) can be mechanically stored regardless of whether or not the window glass reaches the fully closed position (upper maximum move limit), and thus the move control of window glass can be accurately carried out without errors. Even though, for example, the window glass stops before reaching the true fully closed position (upper maximum move limit), this is accurately detected when the window glass later passes the position 4 mm away from the fully closed position, and the move control of the window glass can be accurately carried out without errors.

Thus, in the position detector 90, by sufficiently rotating the shaft 20 of the motor 10 in the forward direction once at the time of assembling to the vehicle, the move pin 100 compresses the limit switch 118 and the limit switch 118 is in a non-conduction state, and it is automatically set to the initial state which the extension end portion 119 of the guide groove 114 contacts the move pin 100. The initial position can be set easily without cumbersome positional adjustment at the time of assembling and cumbersome resetting after the assembling work. The move control of the window glass can be accurately carried out without errors.

In the third embodiment, the magnet 104 comprising a clutch mechanism is attached to the connection shaft 102 and the ring plate 112 is attached to the rotation plate 106. Normally, the rotation plate 106 is held with the connection shaft 102 as a single unit by the magnetic force of the magnet 104. However, the clutch mechanism is not limited to this configuration.

Figure 16:
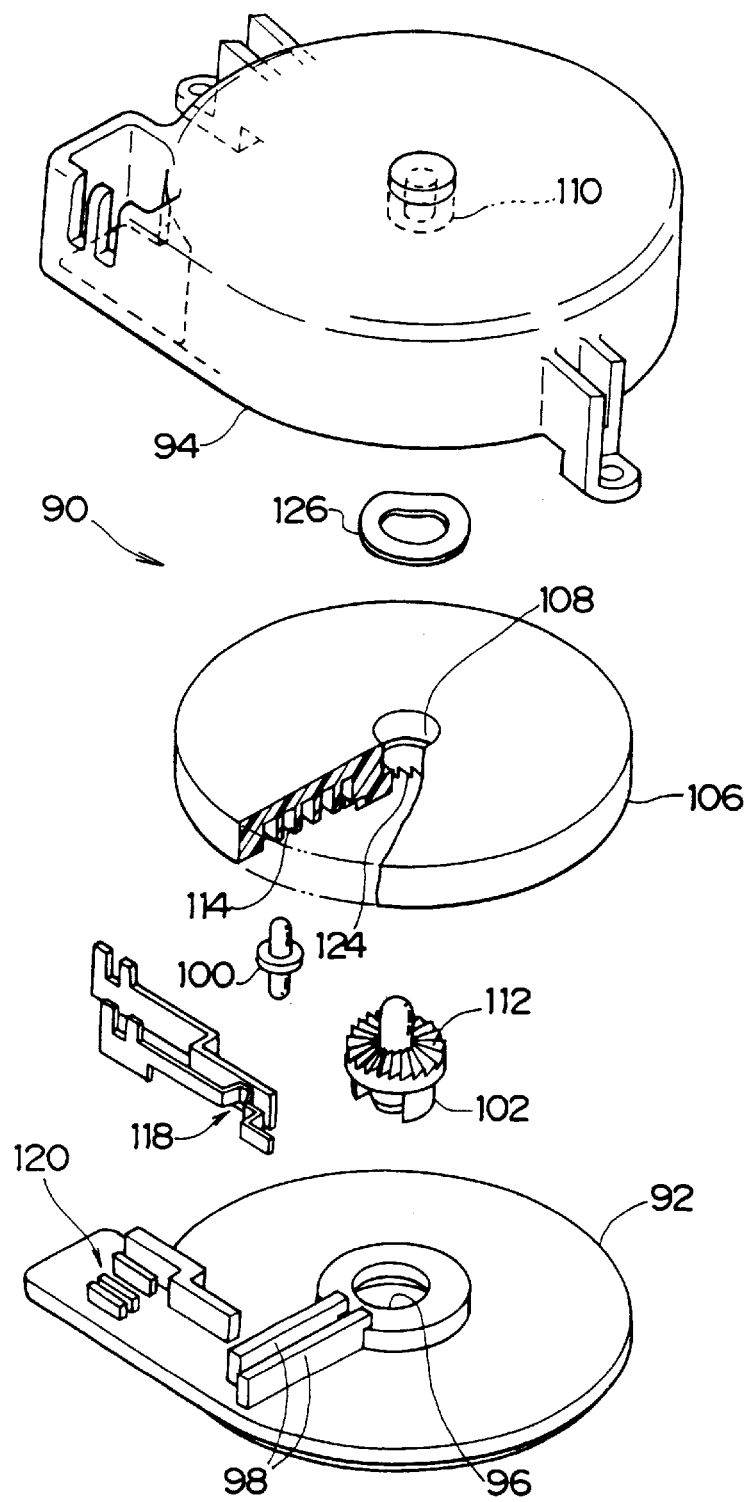
FIG. 16 is a general disassembled perspective view illustrating modification of the position detector in the third embodiment of the present invention.
Figure 17:
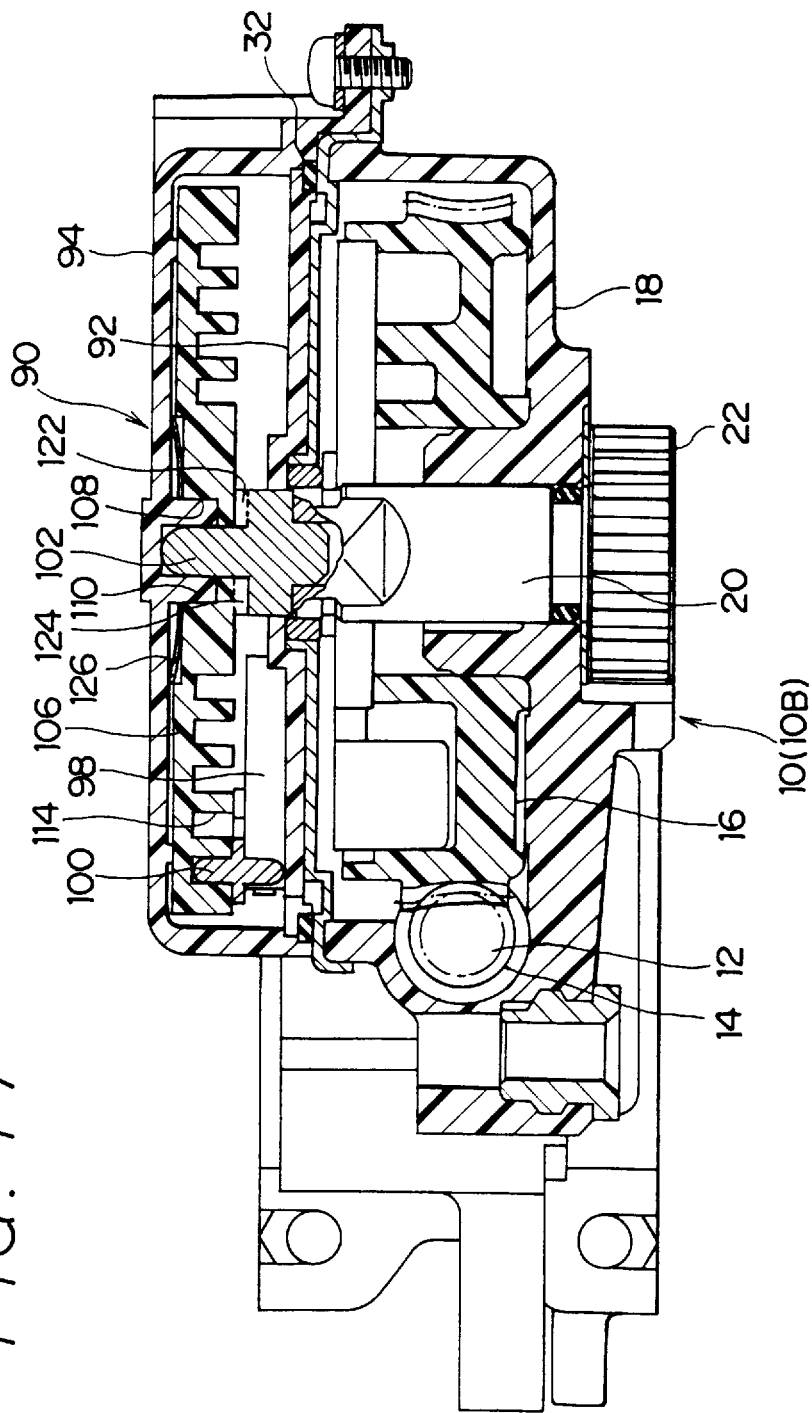
FIG. 17 is a cross-sectional view of the modification of the position detector illustrating in FIG. 16 in the third embodiment of the present invention and the motor of the power window device applied with the position detector.

For example, as shown in FIGS. 16 and 17, in place of the magnet 104, the ratchet portion 122 with continued notches is installed on the connection shaft 102. Also, the gear tooth 124 corresponding to the ratchet portion 122 is installed at the periphery of the supporting hole 108 on the back side of the rotation plate 106. Moreover, the wave washer 126 is disposed between the rotation plate 106 and the cover plate 94.

Even in this case, normally the ratchet portion 122 engages with the gear tooth 124 of the rotation plate 106 so that the rotation plate 106 rotates together with the connection shaft 102. On the other hand, the move pin 100 compresses the limit switch 118, the limit switch 118 is in a non-conduction state and the move to the outside of the radius direction is stopped. The extension end 119 (not illustrated) of the guide groove 114 contacts the move pin 100 and the further rotation of the rotation plate 106 is stopped. Thus, the rotation force in the forward direction of the connection shaft 102 surpassing the holding force of the rotation plate 106 by the ratchet portion 128 cancels the engagement between the ratchet portion 122 and the gear tooth 124 and the transmission of the rotation force in the forward direction from the connection shaft 102 to the rotation plate 10 is shut off. Thus, by sufficiently rotating the shaft 20 of the motor 10 in the forward direction once at the time of assembling to the vehicle, the move pin 100 compresses the limit switch 118 and the limit switch 118 is in a non-conduction state so that it can be automatically set to the initial state which the extension end portion 119 of the guide groove 114 contacts the move pin 100. The initial position can be set easily without cumbersome positional adjustment at the time of assembling and cumbersome resetting after the assembling work.

Figure 18:
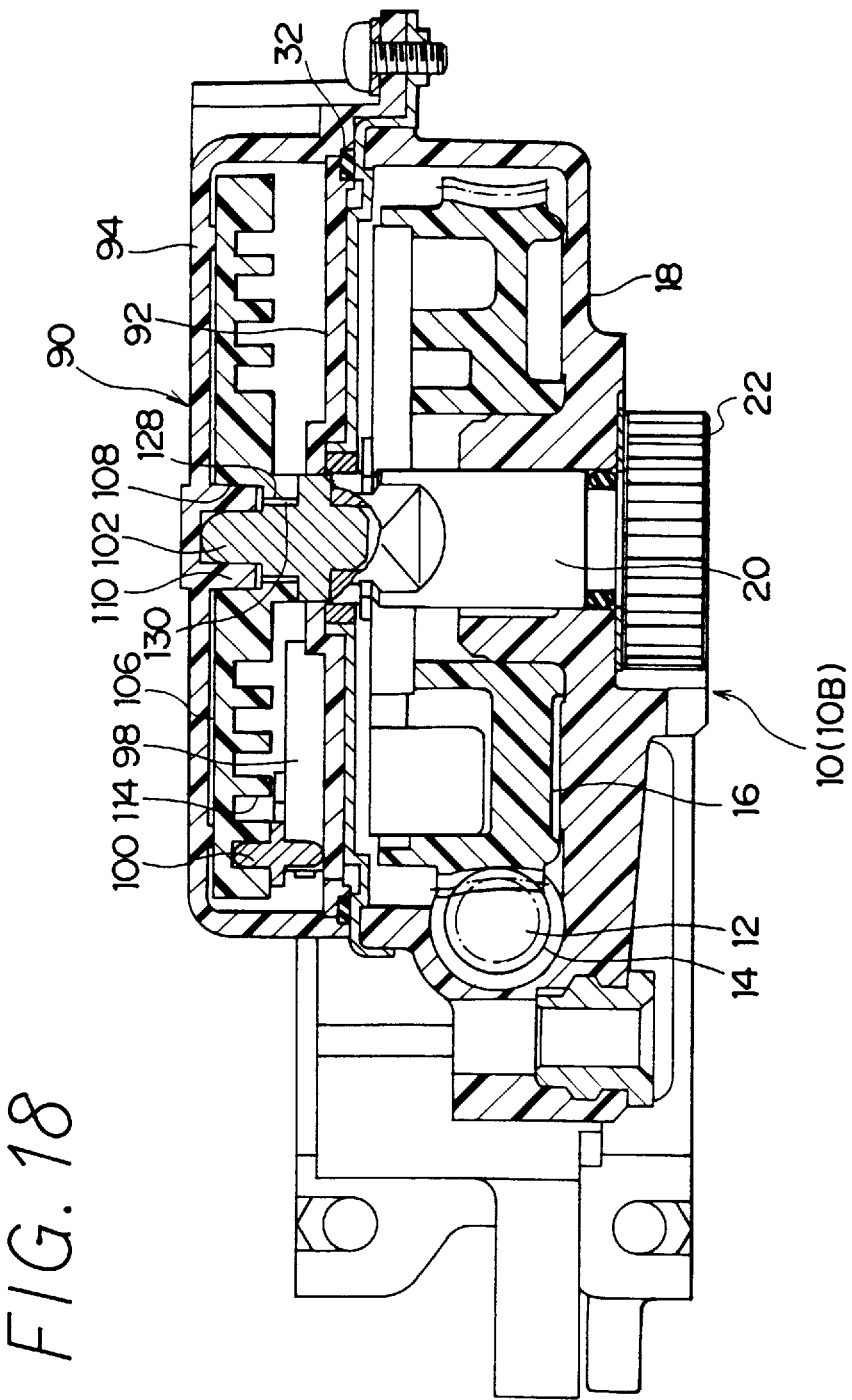
FIG. 18 is a cross-sectional view of the other modification of the position detector in the third embodiment of the present invention and the motor of the power window device applied with the position detector.
Figure 19:
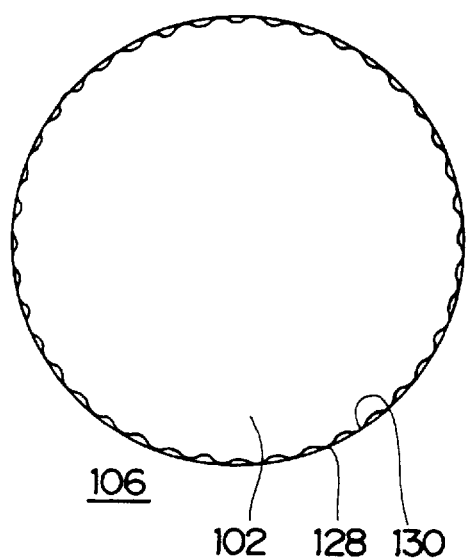
FIG. 19 is a plan illustrating a ratchet portion installed in the connection shaft of the other modification of the position detector in the third embodiment of the present invention.

Furthermore, for example, as shown in FIGS. 18 and 19, the ratchet portion 128 with the same continued notches is set in the periphery of the connection shaft 102, and the gear tooth 130 corresponding to ratchet portion 128 is formed on the inner circumference wall of the supporting hole 108 of the rotation plate 106.

Even in this case, normally the ratchet portion 128 engages with the gear tooth 124 of the rotation plate 106 so that the rotation plate 106 rotates together with the connection shaft 102. On the other hand, the move pin 100 compresses the limit switch 118, the limit switch 118 is in a non-conduction state and the move to the outside of the radius direction is stopped. The extension end 119 (not illustrated) of the guide groove 114 contacts the move pin 100 and the further rotation of the rotation plate 106 is stopped. Thus, the rotation force in the forward direction of the connection shaft 102 surpassing the holding force of the rotation plate 106 by the ratchet portion 128 cancels the engagement between the ratchet portion 128 and the gear tooth 124 and the transmission of the rotation force in the forward direction from the connection shaft 102 to the rotation plate 10 is shut off. Thus, by sufficiently rotating the shaft 20 of the motor 10 in the forward direction once at the time of assembling to the vehicle, the move pin 100 compresses the limit switch 118 and the limit switch 118 is in a non-conduction state so that it can be automatically set to the initial state in which the extension end portion 119 of the guide groove 114 contacts the move pin 100. The initial position can be set easily without cumbersome positional adjustment at the time of assembling and cumbersome resetting after the assembling work.

Figure 20:
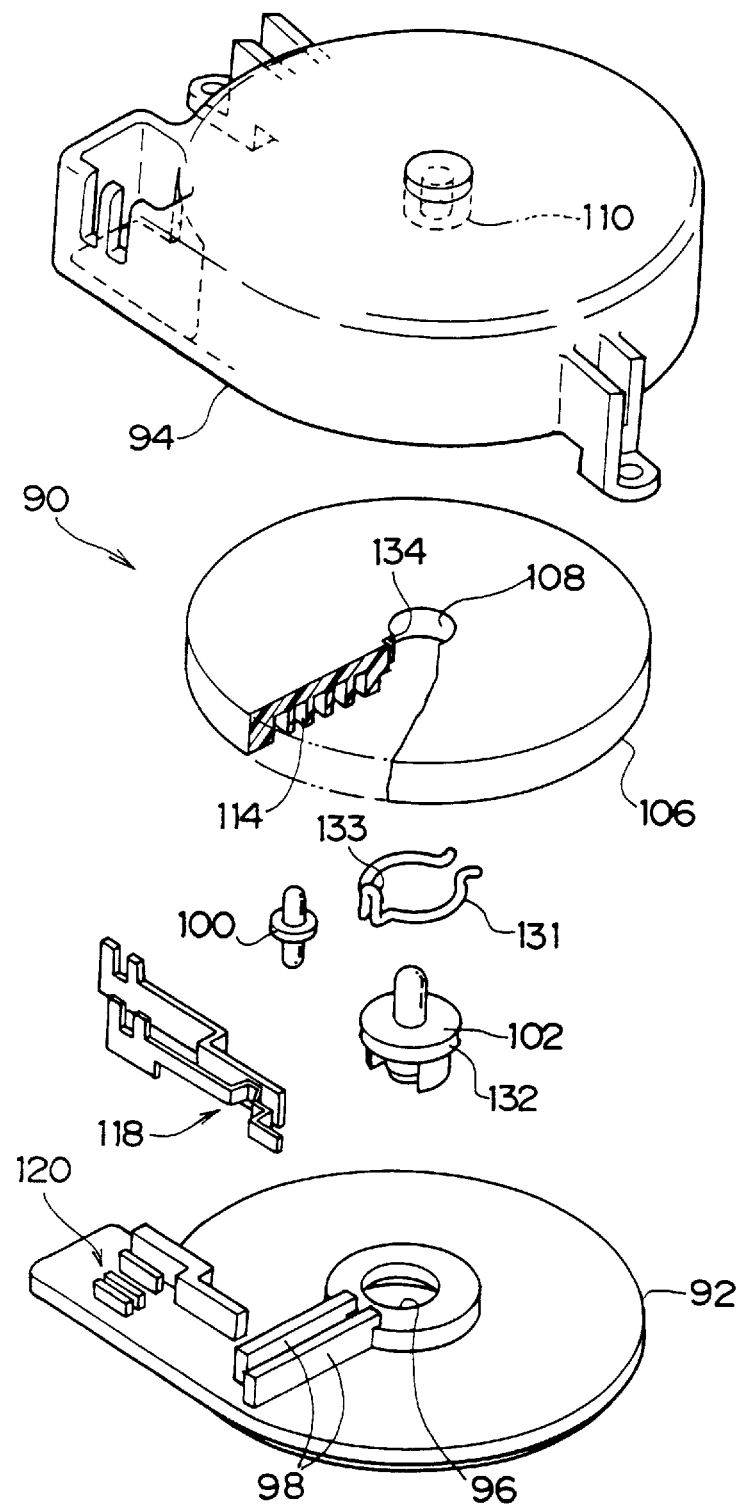
FIG. 20 is a disassembled perspective view illustrating the other modification of the position detector in the third embodiment of the present invention.

Furthermore, for example, as shown in FIG. 20, in place of the magnet 104, an approximate U-shaped friction spring 131 is installed, and by elastically fitting the friction spring 131 into the groove 132 of the connection shaft 10. Also, the fixed protrusion 133 of the friction spring 131 fits onto the groove 134 of the rotation plate 106 so that they are fixed together as a single unit.

Even in this case, the friction spring 131 fixed at the rotation plate 106 as a single unit holds the groove 132 of the connection shaft 102 so that the rotation plate 106 normally rotates together with the connection shaft 102. On the other hand, the move pin 100 compresses the limit switch 118 and the limit switch 118 is in a non-conduction state and the move to the outside of the radius direction is stopped. The extension end 119 (not illustrated) of the guide groove 114 contacts the move pin 100 and the further rotation of rotation plate 106 is stopped, the rotation force in the forward direction of the connection shaft 102 surpassing the holding force (the friction force) of the connection shaft 102 by the friction spring 131 allows the relative rotation of the friction spring 131 and the connection shaft 102, and the transmission of the rotation force in the forward direction from the connection shaft 102 to the rotation plate 10 is shut off. Thus, by sufficiently rotating the shaft 20 of the motor 10 in the forward direction once at the time of assembling to the vehicle, the move pin 100 compresses the limit switch 118 and the limit switch 118 is in a non-conduction state so that it can be automatically set to the initial state which the extension end portion 119 of the guide groove 114 contacts the move pin 100. The initial position can be set easily without cumbersome positional adjustment at the time of assembling and cumbersome resetting after the assembling work.

Figure 21:
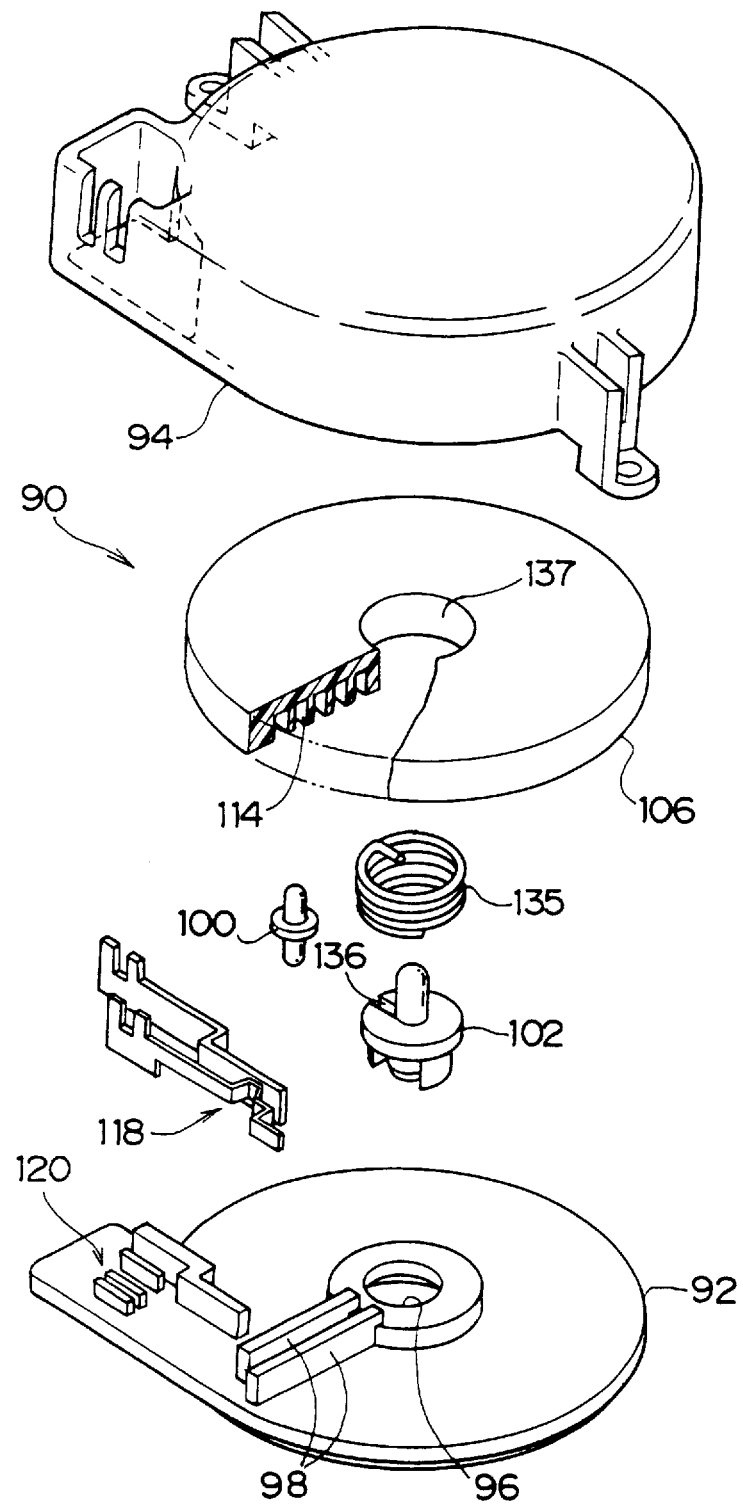
FIG. 21 is a disassembled perspective view illustrating the other modification of the position detector in the third embodiment of the present invention.

Furthermore, for example, as shown in FIG. 21, in place of the magnet 104, the twisted coil spring 135 is installed and one end of the twisted coil spring 135 engages with an engagement groove 136 of the connection shaft 102. Also, the twisted coil spring 135 can be wound and stored in the storage hole 137 of the rotation plate 106 (the state having elasticity in the extended diameter direction).

Even in this case, the twist coil spring 135 is press-fitted to the storage hole 137 of the rotation plate 106 so that the rotation plate 106 normally rotates together with the connection shaft 102. On the other hand, the move pin 100 compresses the limit switch 118 and the limit switch 118 is in a non-conduction state, the move to the outside of the radius direction is stopped. The extension end portion 119 (not illustrated) of the guide groove 114 contacts the move pin 100 and the further rotation of the rotation plate 106 is stopped. Thus, the twisted coil spring 135 is wound in the reduction diameter direction so that the friction between the twisted coil spring 135 and the storage hole 137 is reduced. The rotation force in the forward direction of the connection shaft 102 surpassing the holding force (the friction force) of the connection shaft 102 by the twisted coil spring 135 allows the relative rotation of the twisted coil spring 135 and the connection shaft 102. The transmission of the rotation force in the forward direction from the connection shaft 102 to the rotation plate 106 is shut off. Thus, by sufficiently rotating the shaft 20 of the motor 10 in the forward direction once at the time of assembling to the vehicle, the move pin 100 compresses the limit switch 118 and the limit switch 118 is in a non-conduction state so that it is automatically set to the initial state in which the extension end portion 119 of the guide groove 114 contacts the move pin 100. The initial position can be set easily without cumbersome positional adjustment at the time of assembling and cumbersome resetting after the assembling work.

Figure 22:
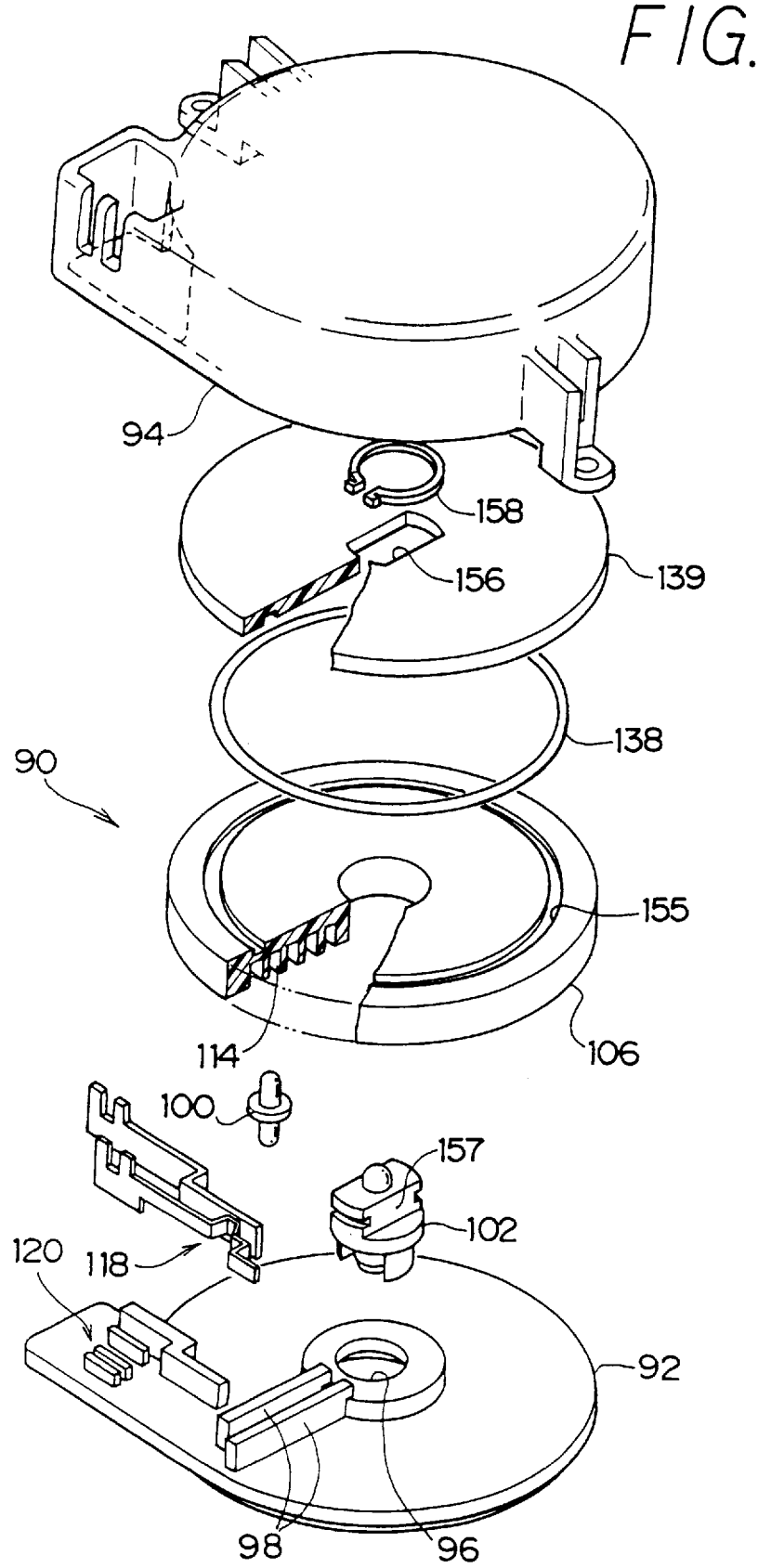
FIG. 22 is a disassembled perspective view illustrating the other modification of the position detector in the third embodiment of the present invention.

Furthermore, as shown in FIG. 22, the O-ring 138 having elasticity and a holding panel 139 are installed corresponding to the rotation plate 106. That is, the O-ring 138 is stored in the storage groove 155 of the rotation plate 106. Furthermore, while the O-ring 138 is compressed and elastically modified, a fitting hole 156 of the holding panel 139 is fitted with an engagement portion 157 of the connection shaft 102 and fixed together as a single unit and is prevented from pulling out by C-ring 158 engaged with the connection shaft 102.

Even in this case, the O-ring 138 press-fitted to the holding panel 139 fixed as a single unit at the connection shaft 102 and the storage groove 155 of the rotation plate 106 so that the rotation plate 106 normally rotates together with the support panel 139, that is, with the connection shaft 102. On the other hand, the move pin 100 compresses the limit switch 118 and the limit switch 118 is in a non-conduction state and the move to the outside of the radius direction is stopped. The extension end 119 (not illustrated) of the guide groove 114 contacts the move pin 100 and the further rotation of rotation plate 106 is stopped. Therefore, the rotation force in the forward direction of the connection shaft 102 surpasses the friction force (the holding force of the rotation plate 106 by the O-ring 138) between the holding panel 139, the rotation plate 106 (the storage groove 155) and the O-ring 138 so that the connection shaft 102 and the rotation plate 106 relatively rotate. The transmission of the rotation force in the forward direction from the connection shaft 102 to the rotation plate 10 is shut off. Thus, by sufficiently rotating the shaft 20 of the motor 10 in the forward direction once at the time of assembling to the vehicle, the move pin 100 compresses the limit switch 118 and the limit switch 118 is in a non-conduction state so that it can be automatically set to the initial state which the extension end portion 119 of the guide groove 114 contacts the move pin 100. The initial position can be set easily without cumbersome positional adjustment at the time of assembling and cumbersome resetting after the assembling work.

Figure 23:
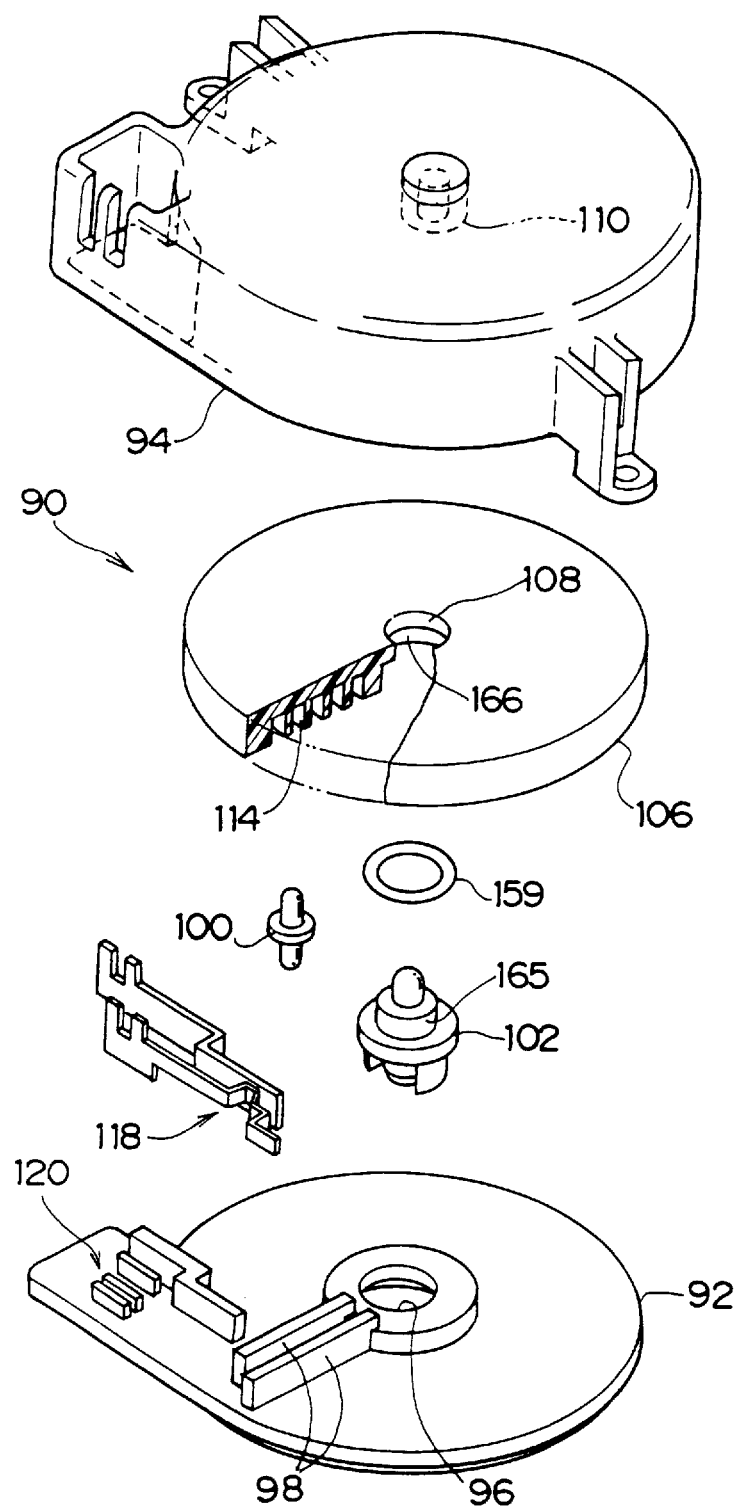
FIG. 23 is a disassembled perspective view illustrating the other modification of the position detector in the third embodiment of the present invention.

For example, as shown in FIG. 23, the O-ring 159 having elasticity can be only installed and the support panel 139 is omitted. That is, the O-ring 159 is mounted on a step portion 165 of the connection shaft 102 and the O-ring 159 is further compressed and is stored in the storage groove 166 of the rotation plate 106 under the elastically deformed condition.

Even in this case, the O-ring 159 is press-fitted to the step portion 165 of the connection shaft 102 and the storage groove 166 of the rotation plate 106 so that the rotation plate 106 normally rotates together with the connection shaft 102. On the other hand, the move pin 100 compresses the limit switch 118 and is in a non-conduction state and the move to the outside of the radius direction is stopped. Also, the extension end portion 119 (not illustrated) of the guide groove 114 contacts the move pin 100 and the further rotation of the rotation plate 106 is stopped. Therefore, the rotation force in the forward direction of the connection shaft 102 surpasses the friction force (the holding force of the rotation plate 106 by the O-ring 158) between the connection shaft 102(the step portion 165), the rotation plate 106 (the storage groove 166) and the O-ring 159 so that the connection shaft 102 and the rotation plate 106 relatively rotate. The transmission of the rotation force in the forward direction from the connection shaft 102 to the rotation plate 10 is shut off. Thus, by sufficiently rotating the shaft 20 of the motor 10 in the forward direction once at the time of assembling to the vehicle, the move pin 100 compresses the limit switch 118 and the limit switch 118 is in a non-conduction state so that it can be automatically set to the initial state which the extension end portion 119 of the guide groove 114 contacts the move pin 100. The initial position can be set easily without cumbersome positional adjustment at the time of assembling and cumbersome resetting after the assembling work.

(Fourth embodiment)

Figure 24:
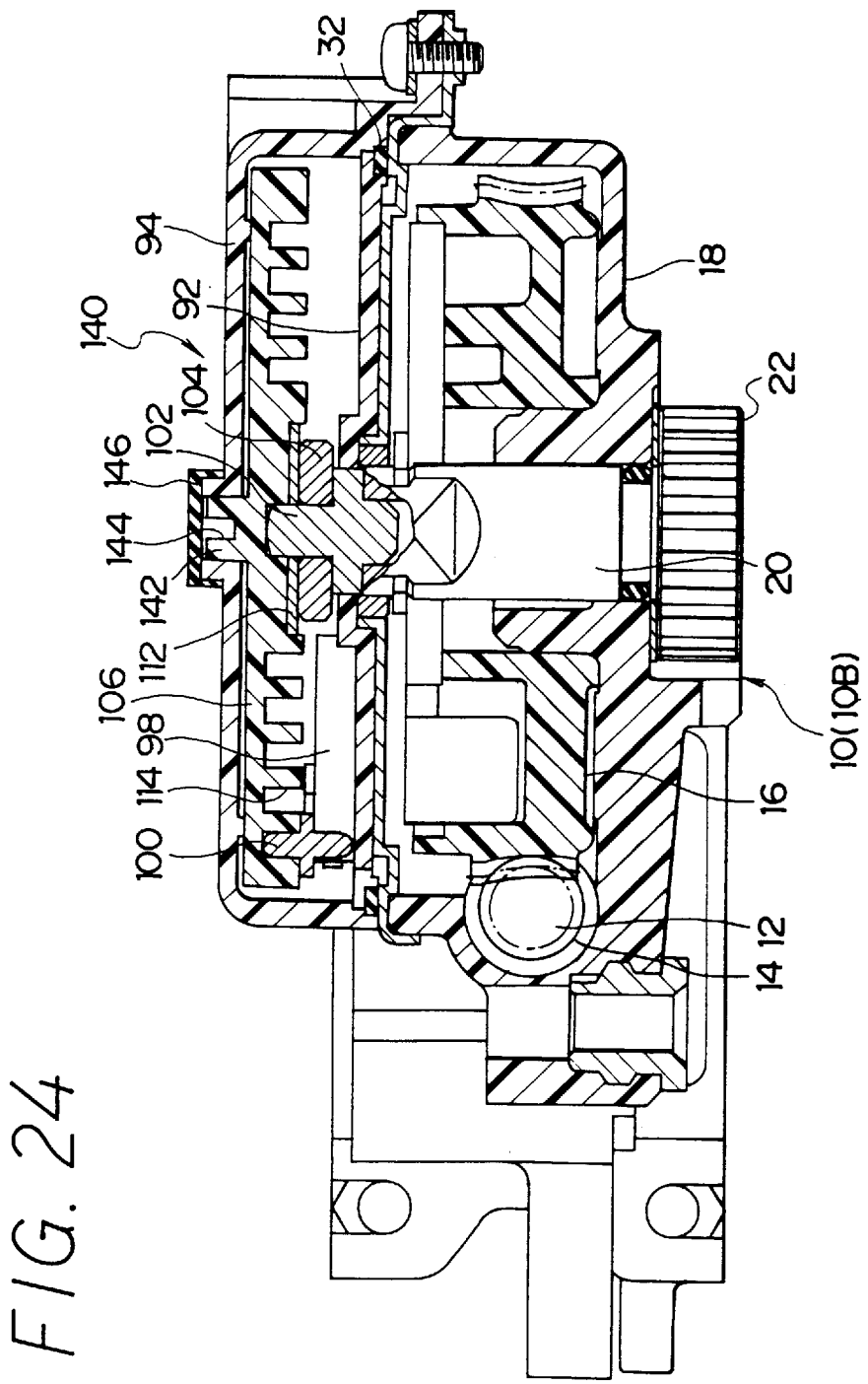
FIG. 24 is a general disassembled perspective view of the motor for the power window device applied with the fourth embodiment of the present invention.

FIG. 24 is a cross-sectional view of a position detector 140 and the motor 10 for the power window device applied with the position detector 140 described in the fourth embodiment of the present invention.

The position detector 140 is basically identical to the position detector 90 in the third embodiment and is equipped with magnet 104 comprising a clutch mechanism and the ring plate 112. Furthermore, in the position detector 140, the shaft portion 142 is formed in the center of the rotation plate 106 as a initial position correction means. The operation groove 144 formed in the shaft portion 142 is exposed to the exterior of the cover plate 94. Furthermore, the shaft portion 142 of the rotation plate 106 exposed to the exterior is normally covered by the rubber cap 146. Thus, by removing the rubber cap 146 and the operating shaft portion 142 (the operation groove 144) from the exterior, the rotation plate 106 can be directly rotated by force.

In the position detector 140 in the fourth embodiment, the shaft portion 142 of the rotation plate 106 can be directly operated from the exterior, the rotation plate 106 can be forced to rotate regardless of the rotation position of the shaft 20 of the motor 10. The move pin 100 compresses the limit switch 118 and is in a non-conduction state so that it is automatically set to the initial state which the extension end portion 119 (not illustrated) of the guide groove 114 contacts the move pin 100.

Thus, for example, when the motor 10 and the position detector 140 are used in the power window device for the vehicle with a catch prevention function, the motor 10 is not actuated at the time of assembling to the vehicle and an initial state can be set with only the operation of the shaft portion 142. The initial position is set without cumbersome positional adjustment at the time of assembling and cumbersome resetting after the assembling work.

In the fourth embodiment, the shape of the operation groove 144 installed on the shaft portion 142 of the rotation plate 106 can be appropriately set with necessity.

In the fourth embodiment, the rotation plate 106 is directly rotated by operating the shaft portion 142 of the rotation plate 106. However, the rotation plate 106 can be rotated indirectly instead.

Figure 25:
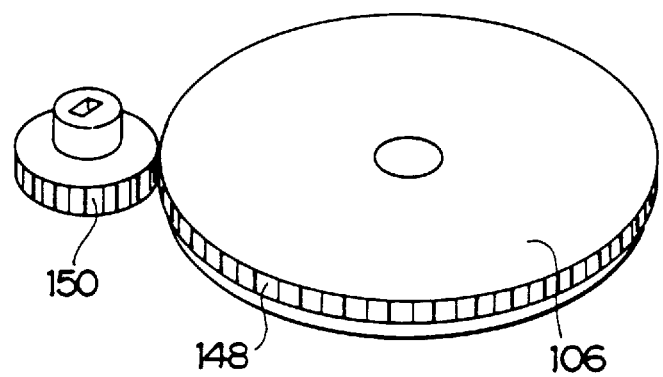
FIG. 25 is a perspective view illustrating the ring gear and supplemental gear of the modification of the position detector in the third embodiment of the present invention.

For example, as shown in FIG. 25, the gear tooth portion 148 is formed on the outer circumference of the rotation plate 106 and the support gear 150 as the initial position correction means that gears with the gear tooth portion 148 is installed. The correction gear 150 can be operated from the exterior. Even in this case, since the rotation plate 106 can be operated from the exterior through the support gear 150, the rotation plate 106 can be forced to rotate regardless of the rotation position of the shaft 20 of the motor 10, and it is in the non-conduction state so that it can be automatically set to the initial state which the move pin 100 compresses the limit switch 118. The initial position can be set easily without cumbersome positional adjustment at the time of assembling and cumbersome resetting after the assembling work.

In the third embodiment (and the modification) and the fourth embodiment (and the modification), the limit switch 118 is disposed at the outside of the end portion in the radius direction of the guide wall 98 formed at the base plate 92 and by being compressed by the move pin 110 reaching the bent portion 116, it is in a non-conduction state. Thus, the rotation position of the shaft 20 is detected. However, the limit switch is not limited to this construction.

Figure 26:
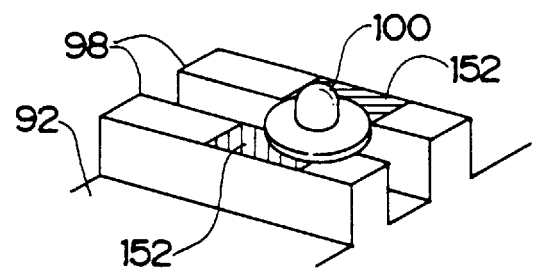
FIG. 26 is a perspective view of the other configuration examples of a limit switch in the third (and the modification) to the fourth (and the modification) embodiments of the present invention.

For example, as shown in FIG. 26, a pair of conduction plates 152 is installed at the position corresponding to the specified rotation position of the shaft 20 at the tip of the guide wall 98 formed at the base plate 92. The move pin 100 itself is formed by a conductive material. Even in this case, the move pin 100 moving by the rotation of the rotation plate 106 contacts the pair of the conductive panels 152 and is in the conductive state (or in the non-conduction state) so that the rotation position of the shaft 20, that is, the position of the window glass can be accurately detected.

Figure 27:
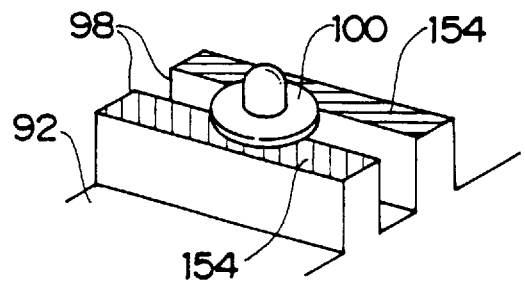
FIG. 27 is a perspective view of the other configuration examples of the limit switch in the third (and the modification) to the fourth (and the modification) embodiments of the present invention.

Furthermore, as shown in FIG. 27, in place of a pair of conductive plates 152, a pair of the conductive plates 154 as a variable resistor throughout the tip portion of the guide wall 98 are installed. In this case, the resistance value changes due to the position of the move pin 100 (the relative position to the conductive panel 154) moving through the rotation of the rotation plate 106. Thus, the rotation position of the shaft 20, that is, the position of the window glass can be detected in a linear and variable manner.

(Fifth embodiment)

Figure 28:
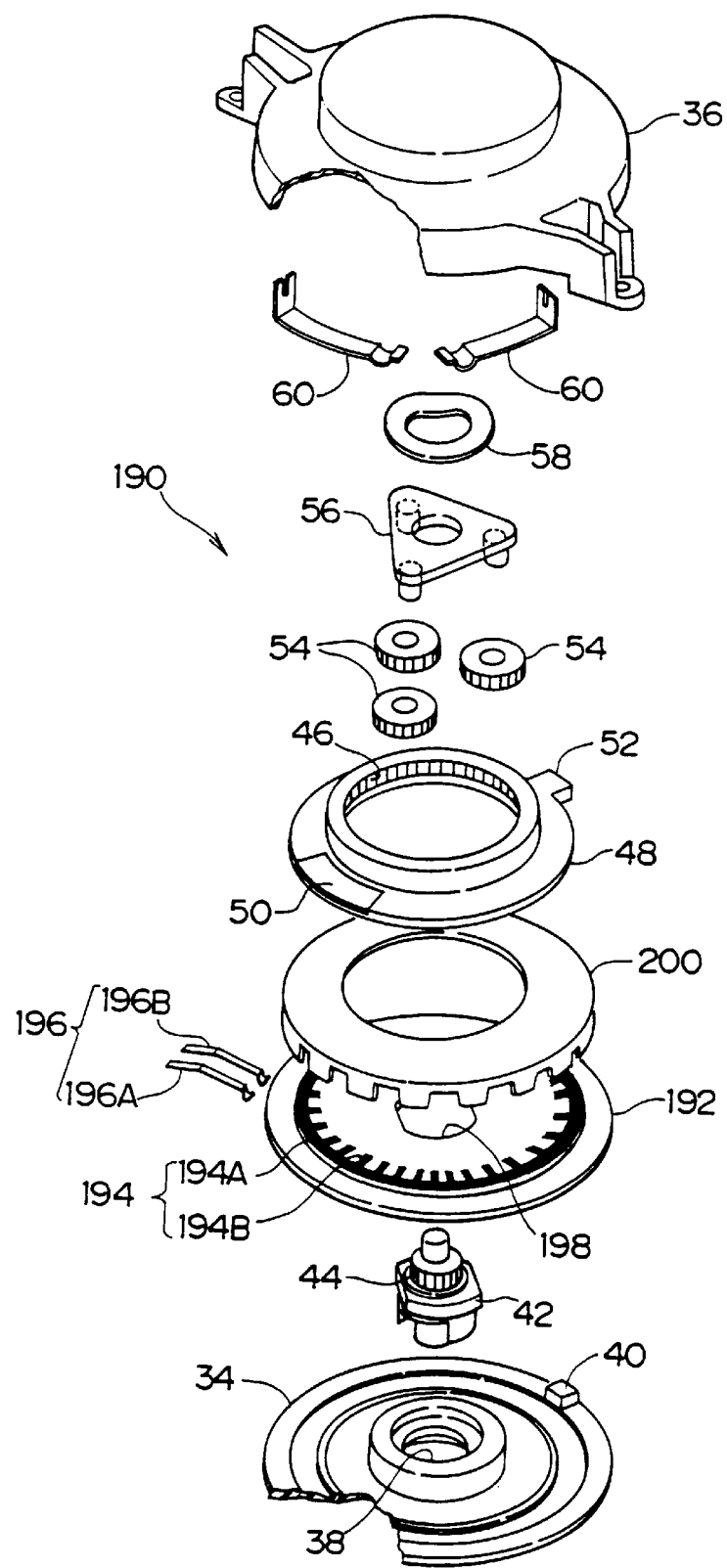
FIG. 28 is a disassembled perspective view of the position detector in the fifth embodiment of the present invention.
Figure 29:
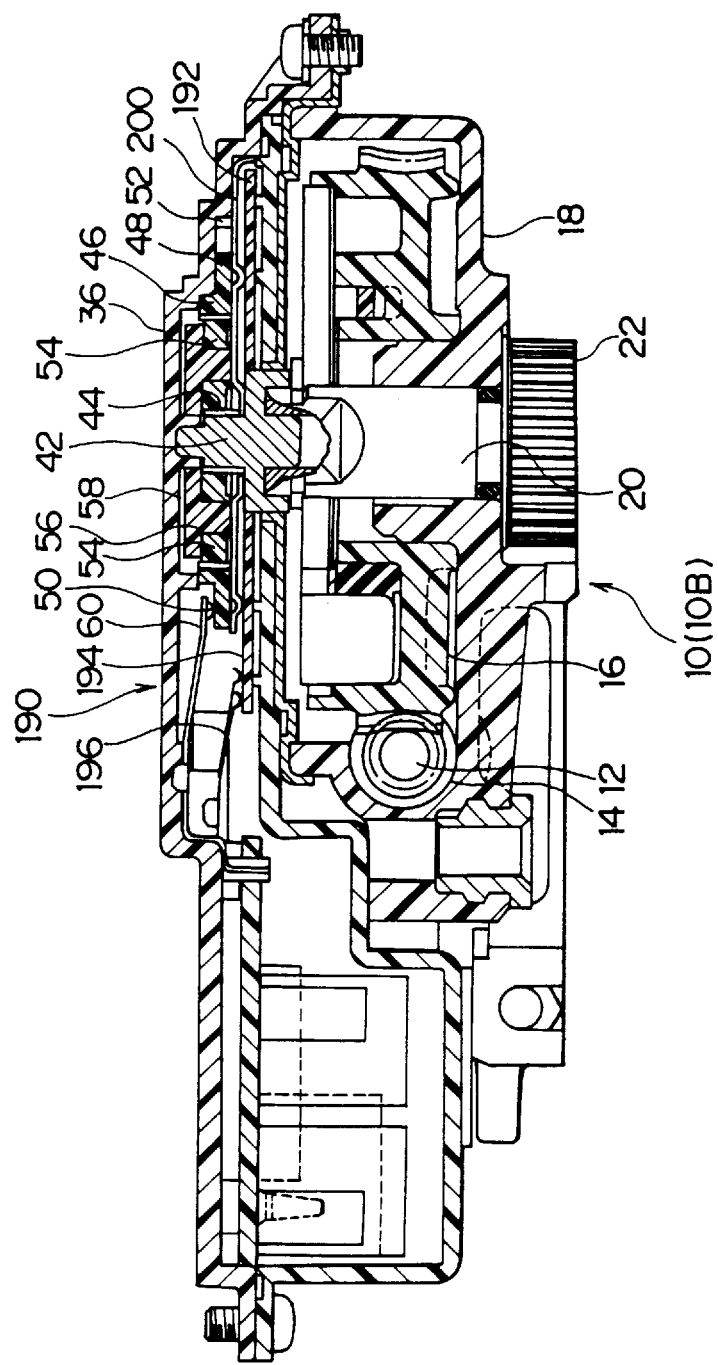
FIG. 29 is a cross-sectional view of the position detector in the fifth embodiment of the present invention.

FIG. 28 shows the perspective view of a position detector 190, in a disassembled condition, in the fifth embodiment of the present invention. FIG. 29 is the cross-sectional view of the motor 10 applied with the position detector 190.

The position detector 190 is basically identical to the position detector 30 in the first embodiment, in addition, the pulse plate 192 (the conduction portion 194) as the pulse generation means and the sliding contact 196 as the pulse detection means are equipped.

The pulse plate 192 is formed as a thin disc panel and a fitting hole 198 formed in the central portion is pressed into the connection shaft 42 and is fixed together as a single unit. Thus, the pulse plate 192 constantly rotates with the connection shaft 42.

The conduction portion 194 installed in the pulse plate 192 is installed along the perimeter direction of the pulse plate 192 in the periphery and comprises the ring-shaped first conduction portion 194A and the second conduction portion 194B with continued pulse-shaped notches and adjacent to the first conduction portion 194A. On the other hand, the base portion of the sliding contact 196 is fixed to the cover plate 36 and is extended toward the conduction portion 194 and comprises the input contact 196A constantly contacting the first conduction section 194A of the conduction portion 194 and the output contact 196B contacting the second conduction portion 194B of the conduction portion 194. Thus, the pulse signal can be detected by following the rotation of the pulse plate 192. The detected pulse signal is used in the move position control for a moving body (the window glass).

The conduction portion 194 can be installed in the side wall of the periphery of the pulse plate 192 instead of the upper surface thereof. In this case, the sliding contact 196 is fixed to the cover plate 36 opposing the side wall of the periphery of the pulse plate 192.

Furthermore, in the position detector 190, a protection plate 200 is disposed between the pulse plate 192 and the ring gear 46 (the flange portion 48). The periphery of the protection plate 200 is held and fixed by the cover plate 36 and by existing between the cover plate 192 and the ring gear 46 (the flange portion 48), the protection plate 200 limits the movement so as not to contact the two with each other.

In the position detector 190 in the fifth embodiment, by following the rotation of the pulse plate 192, the output contact 196B repeats the contact/non-contact at the second conduction portion 194B of the conduction portion 194 so that the pulse signal is detected. Thus, based on the detected pulse signal, the rotation position of the shaft 20 of the motor 10 can be detected linearly.

Thus, for example, when the position detector 190 is used in the power window device for a vehicle with a catch prevention function, the move position of the window glass can be constantly detected and controlled linearly.

(Sixth embodiment)

Figure 30:
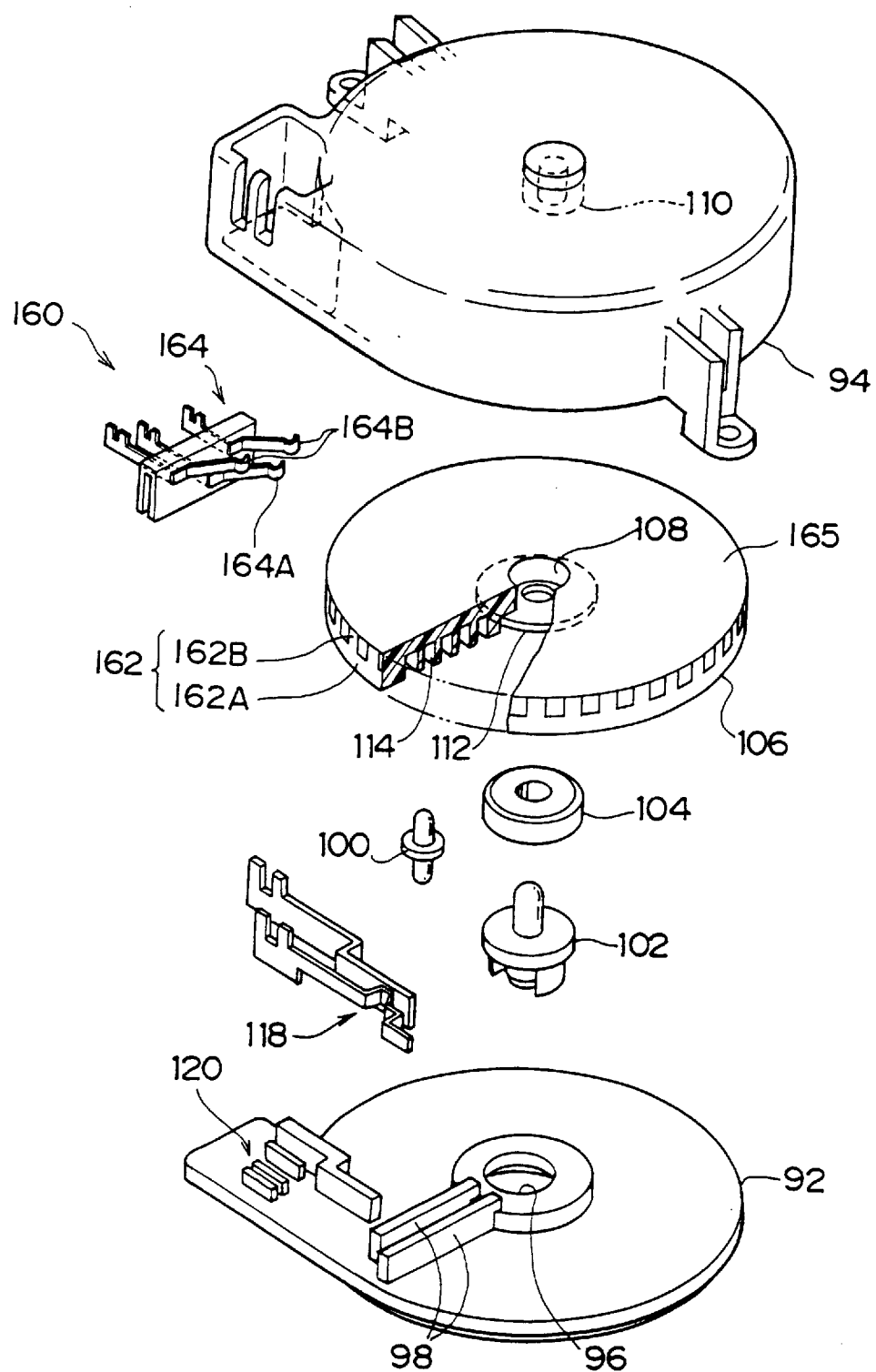
FIG. 30 is a disassembled perspective view of the position detector in the sixth embodiment of the present invention.

FIG. 30 is the perspective view of the position detector 160, in the disassembled condition, described in the sixth embodiment of the present invention.

The position detector 160 is basically identical to the position detector 90 in the third embodiment, in addition, the conduction portion 162 as the pulse generation means and the sliding contact 164 as the pulse detection means are equipped.

The conduction portion 162 is installed in the side wall of the periphery of the rotation plate 106 and comprises the ring-shaped first conduction portion 162A and the second conduction portion 162B being adjacent thereto and having continued pulse-shaped notches. On the other hand, the base portion of the sliding contact 164 is fixed to the cover plate 94 and extends toward the conduction portion 162. The input contact 164A constantly contacting the first conduction section 162A of the conduction portion 162 and a pair of output contacts 164B contacting the second conduction portion 194B of the conduction portion 162 are comprised. Thus, the pulse signal can be detected by following the rotation of the pulse plate 192.

In the position detector 160 in the sixth embodiment, by following the rotation of the rotation plate 106, a pair of output contacts 164B repeat the contact/non-contact at the second conduction portion 162B of the conduction portion 162 so that the pulse signal is detected. Thus, based on the detected pulse signal, the rotation position of the shaft 20 of the motor 10 can be detected linearly.

Thus, for example, when the position detector 160 is used in the power window device for a vehicle with a catch prevention function, the move position of the window glass can constantly be detected and controlled linearly.

In the position detector 160 in the sixth embodiment, the conduction portion 162 is installed at the side wall of the periphery of the rotation plate 106. However, the installation position of the conduction portion 162 is not limited to this.

Figure 31:
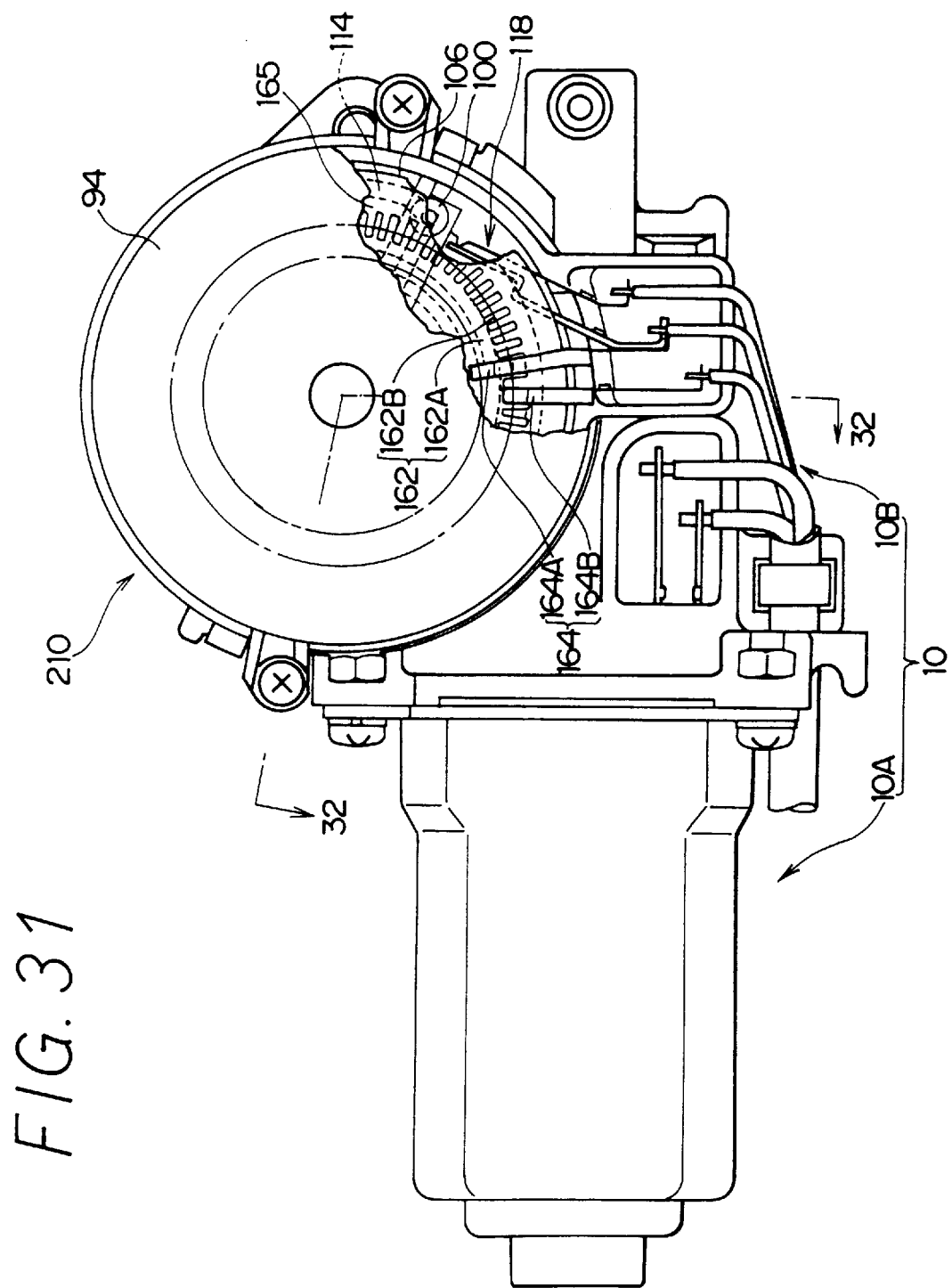
FIG. 31 is a partial plan view of the other modification of the position detector in the sixth embodiment of the present invention and the motor of power window device applied with the position detector.
Figure 32:
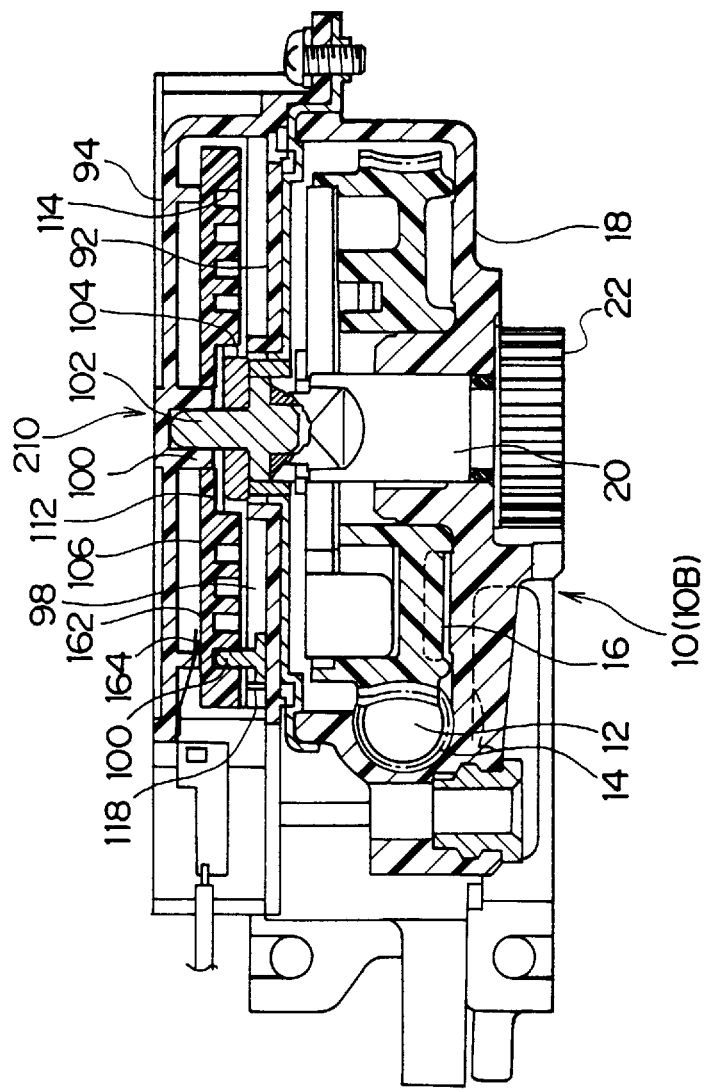
FIG. 32 is a cross-sectional view taken along the line 32—32 in FIG. 31 of the modification of the position detector in the sixth embodiment of the present invention and the motor for the power window device applied with the detector.

For example, in the position detector 210 shown in FIGS. 31 and 32, the conduction portion 162 (the first conduction portion 162A and the second conduction portion 162B) is installed at the upper surface 165 of the rotation plate 106. In this case, the sliding contact 164 is fixed at the cover plate 94 opposing the upper surface 165 of the rotation plate 106.

In a position detector 210, as in the case of the position detector 160, by following the rotation of the rotation plate 106, the output contact 164B repeats the contact/non-contact at the second conduction portion 162B of the conduction portion 162 so that the pulse signal is detected. Thus, based on the detected pulse signal, the rotation position of the shaft 20 of the motor 10 can be detected linearly.

In the first through sixth embodiments, the position detectors 30, 70, 90, 140, 160, 190, 210 or the like are directly applied in the motor 10 for the power window device. However, the position detectors 30, 70, 90, 140, 160, 190 and 210 are not limited to being directly applied in the motor such as the motor 10 and can be applied in the other mechanisms and portions.

Figure 33:
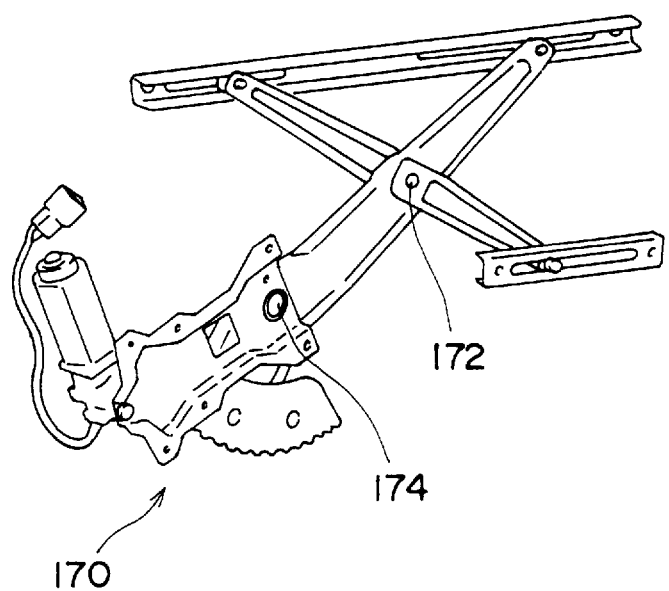
FIG. 33 is a perspective view illustrating the other application examples of the position detector in the present invention.
Figure 34:
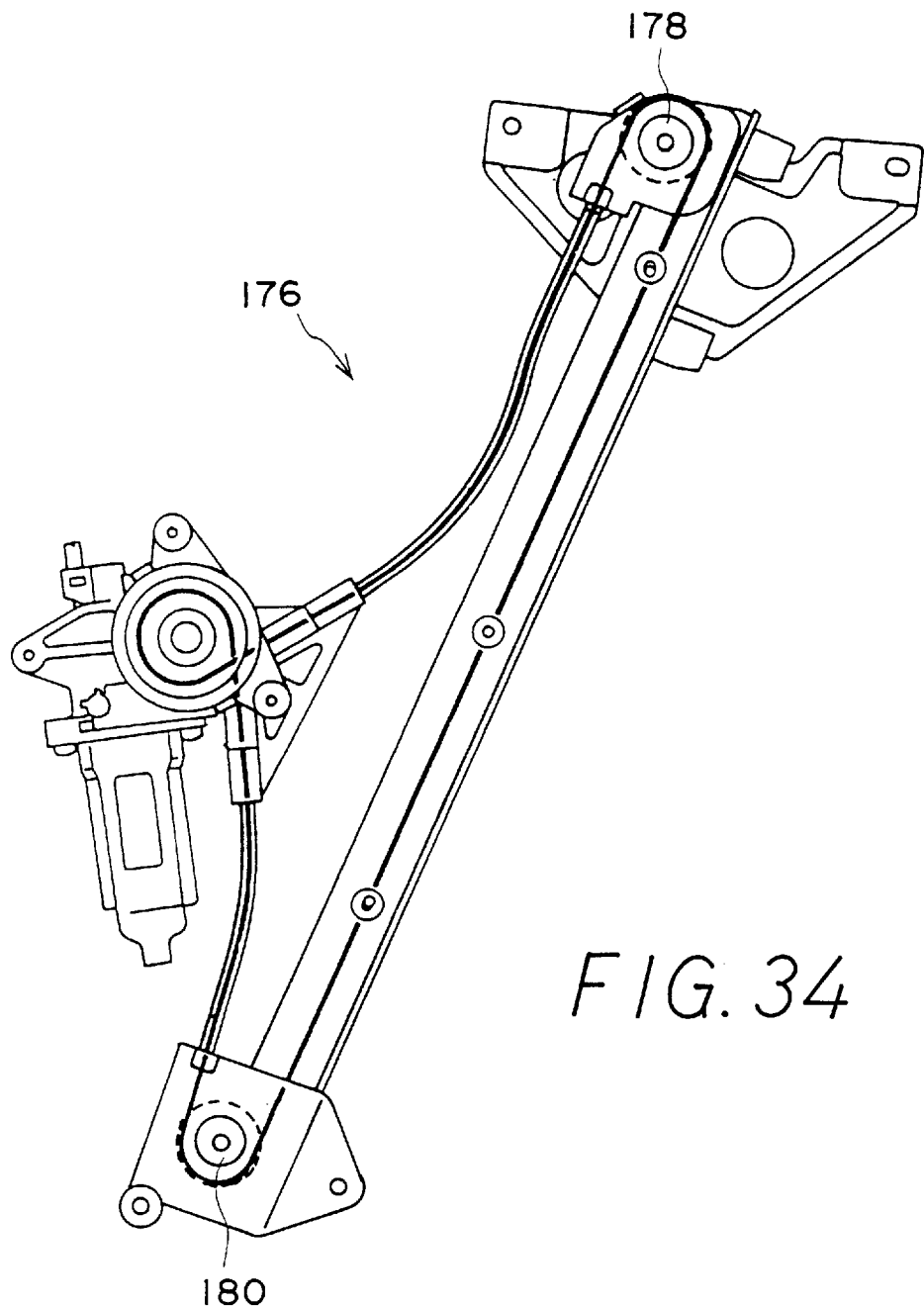
FIG. 34 is a front view of the other application examples of the position detector in the present invention.

For example, as shown in FIG. 33, the position detector 210 does not need to be installed at an X-arm type rotation support shaft 172 and the rotation shaft 174 of the window regulator 170. As shown in FIG. 34, the position detector 210 can be installed at wire-wound pulleys 178 and 180 of the wire type window regulator 176. Even in this case, the position of the window glass is detected accurately and the move control can be carried out accurately and the initial position is set easily without cumbersome positional adjustment at the time of assembling and cumbersome resetting after the assembling work.

(Seventh embodiment)

The specific control method in the case in which the position detectors 190, 160, 210 or the like shown in the fifth and sixth embodiments (and the modifications) is applied in the motor 10 of the power window device and the move position of the window glass is controlled.

The power window device described in the following has a catch prevention mechanism and position detectors 190, 160, 210 or the like is used in the position control of the window glass for the catch prevention.

Figure 35:
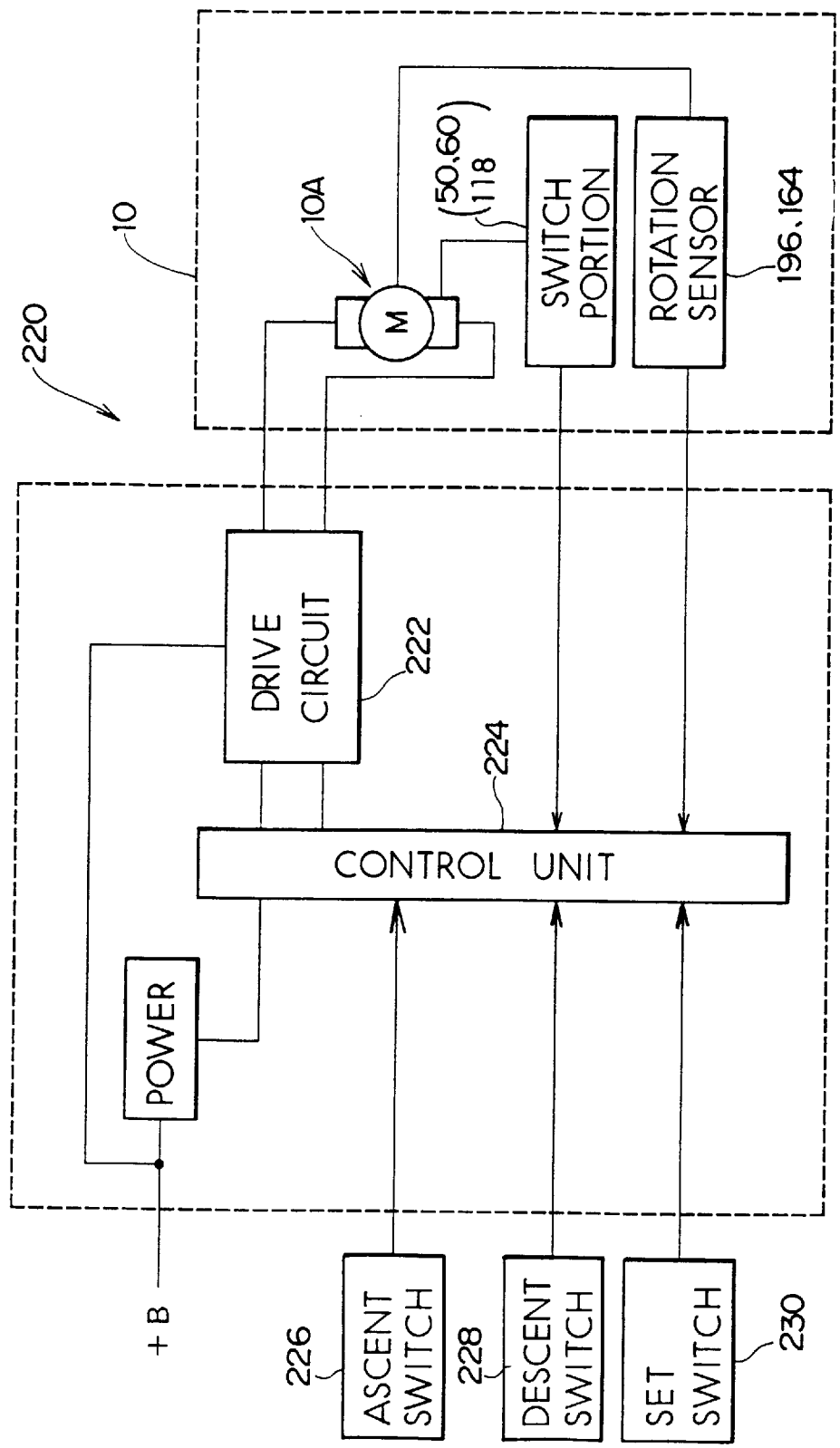
FIG. 35 is a block diagram illustrating the main portions of power window device in the seventh embodiment of the present invention.

FIG. 35 shows the block diagram of the major portions of the power window device 220 described in the seventh embodiment. In the power window device 220, the motor portion 10A of the motor 10 is connected to the control circuit 224 through a drive circuit 222 and the switch (the move contact 50, the fixed contact 60, the limit switch 118 or the like) and the rotation sensors (the sliding contact 196, the sliding contact 164 or the like) are connected thereto. The ascent switch 226 for the window glass move control and a descent switch 228 are connected to the control circuit 224, and furthermore, a set switch 230 for the pulse number memorization is connected thereto.

Figure 36:
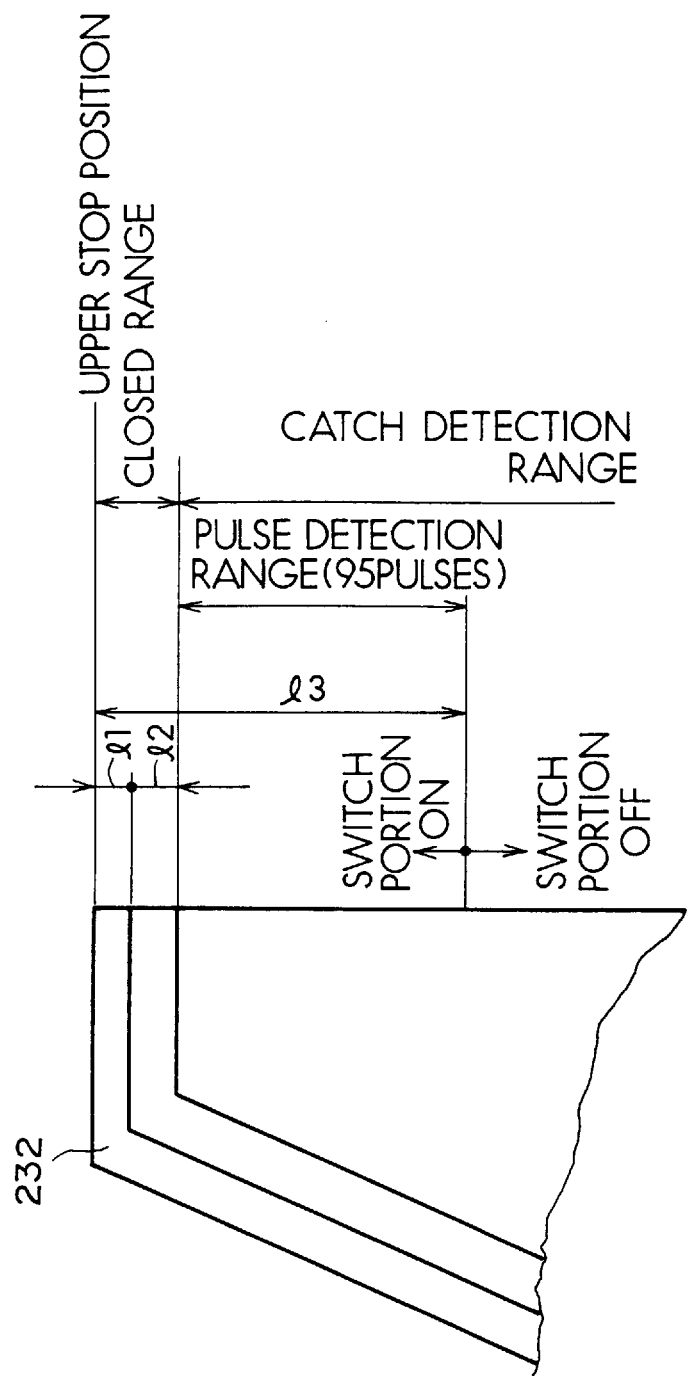
FIG. 36 is a configurational diagram illustrating the corresponding relationship to the reference move position and the catch prevention range of the window glass in the power window device in the seventh embodiment of the present invention.

In the seventh embodiment, as shown in FIG. 36 in detail, the width of a run channel 232 of a vehicle door extends 6 mm ($l_1$) from the upper stop position of the window glass to downward, and the range 4 mm ($l_2$) away from the lower end position of the run channel 232 to downward (the range extending 10 mm ($l_1+l_2$) from the upper top position of the window glass to downward) is set as a closed range of the window glass. Thus, the position further below the position being 10 mm ($l_1+l_2$) away from the upper stop position of the window glass to downward is set as a catch detection range.

The switch (the move contact 50, the fixed contact 60, the limit switch 118 or the like) of the position detectors 190, 160, 210 or the like are set so that, for example, they can be turned ON/OFF at the position (standard move position $l_3$) 200 mm away from the upper stop position of the window glass to downward. Furthermore, every time the window glass moves for 2 mm, the rotation sensor (the sliding contact 196, the sliding contact 164 or the like) detects the signal of one pulse. Thus, the period between the switch portion turns ON/OFF and the window glass reaches the closed range (the range of 190 mm that is the 200 mm minus 10 mm) is equivalent to 95 pulses. Furthermore, in the range which the switch turns off (the position further below the 200 mm) the pulse signal by the rotation sensor is not measured (counted). This state is also illustrated in a timing chart in FIG. 39.

In the following, the pulse signal value of the 95 pulses is called a pulse correction value and is stored in the memory of the control circuit 224. When the pulse correction value is set (stored) (for example, at the time of product delivery), first the window glass is moved upward and the pulse correction signal stopped at the position 4 mm below the lower end portion of the run channel 232 (the position 100 mm below the upper stop position). Next, by operating (turning ON) the set switch 230 for the pulse number memory and following the control program described later, the measured value of the pulse signal by the rotation sensor is set (stored) as the pulse correction value.

In this case, as mentioned above, in order to accurately stop the window glass at the position 4 mm below the low end position of the run channel 232, a jig or the like for setting can be used. That is, by canceling a catch prevention mechanism of the power window device 220 once and a setting jig rod with an external diameter of 4 mm is caught between the run channel 232 and the window glass, the window glass can be stopped at an accurate position. In addition, by operating (turning ON) the set switch 230 for the pulse number memorization in the state, the measured value of the pulse signal by the rotation sensor can be accurately set (stored) as the pulse correction value.

In the seventh embodiment, although the set switch 230 is specially installed for the pulse number memorization, the set switch 230 can be substituted by a combination of existing switches (ascent SW, descent SW).

Next, the effects of the seventh embodiment will be described with the reference to the flow charts illustrated in FIGS. 37 and 38.

Figure 37:
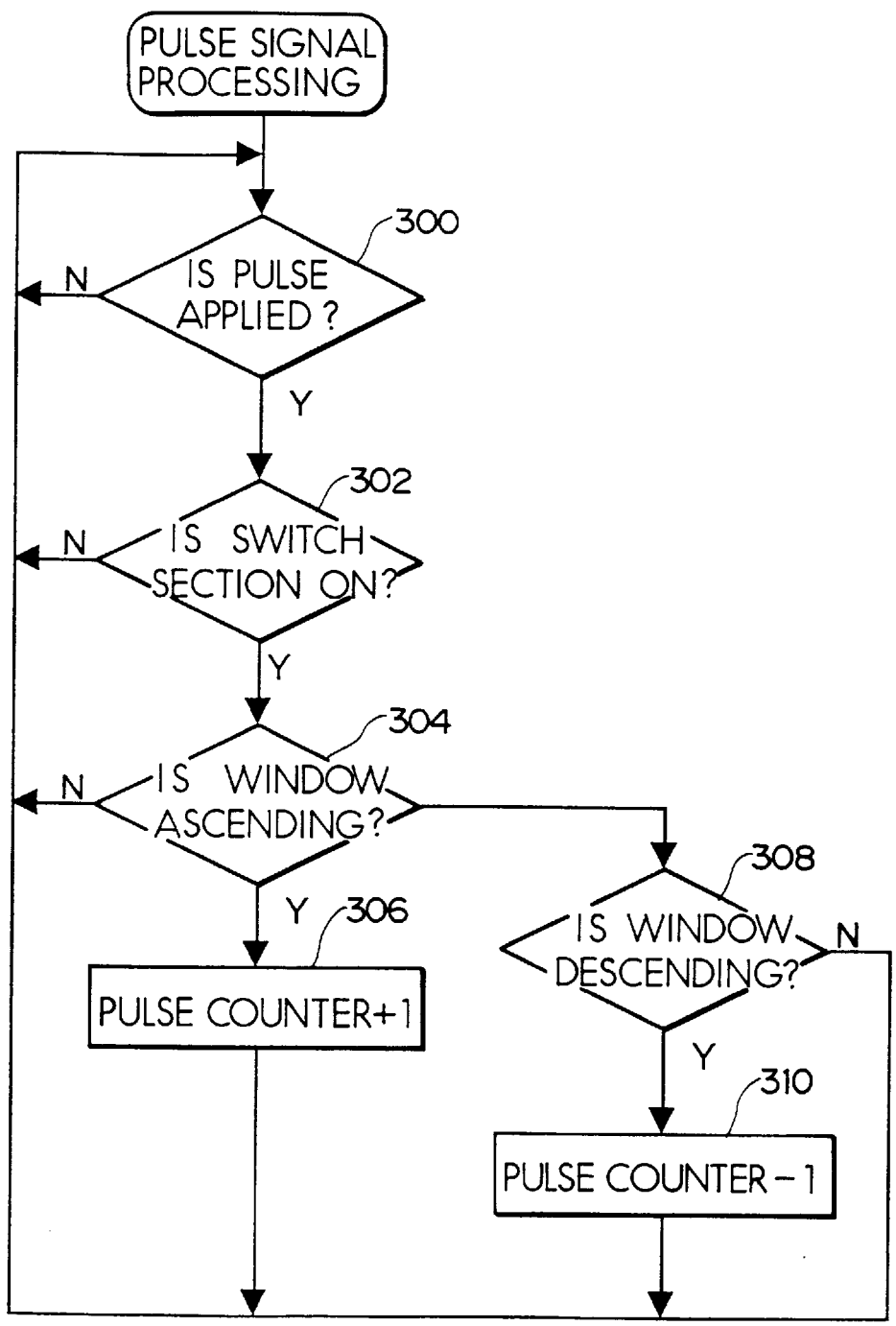
FIG. 37 is a flow diagram illustrating the control program of a pulse signal processing by a rotation sensor of the power window device in the seventh embodiment of the present invention.

First, FIG. 37 shows the control program of the pulse signal processing by the rotation sensor (the sliding contact 196, the sliding contact 164 or the like). In the pulse signal processing, whether or not the pulse signal from the rotation sensor is input is determined in a step 300. When the pulse signal is input, the ON/OFF state (that is, whether or not the window glass reaches the position 200 mm below the upper stop position) of the switch portion (the move contact 50, the fixed contact 60, the limit switch 118 or the like) is determined in a step 302. If the switch is in the ON state (the state which the window glass reaches the position 200 mm below the upper stop position and is positioned at a position higher than that), the process progresses to a step 304, and whether or not the window glass ascends is determined. If the window glass ascends, the measured value of the pulse signal by the rotation sensor is incremented for one pulse in a step 306. If it is determined in the step 304 that the window glass does not ascend, the process moves to a step 308 and whether or not the window glass descends is determined. If the window glass descends, the measured value of the pulse signal by the rotation sensor is decremented for one pulse in a step 310.

Next, FIG. 38 shows the control program when the ascent switch 226 or the descent switch 228 is operated. That is, in a step 320, when an operation of the ascent switch 226 of the power window device 220 is checked, in a step 322, the motor 10 actuates and the shaft 20 rotates so that the window regulator is actuated and the window glass ascends. Furthermore, following the ascent of the window glass, the pulse signal from the rotation sensor is measured. Next, in a step 324, the measured value of the pulse signal and the pulse correction value (95 pulse) are compared so that whether or not the window glass is in the catch detection range is determined.

In the step 324, if the measured value of the pulse signal reaches the pulse correction value (95 pulse) (that is, if the window glass surpasses the catch prevention range and reaches the closed range), the window is stopped after the rotation of the motor 10 continues and the window reaches the run channel 232.

On the other hand, if the measured value of the pulse signal is below the pulse correction value (95 pulse) (that is, if the window glass is in the catch prevention range), the process moves on to a step 326 and whether or not something is caught is determined based on the pulse width (cycle) of the measured pulse signal, that is, the percentage of decreasing in a rotation speed of the motor 10. If catching is checked in the step 326, in a step 328, whether or not the switch is ON (whether or not the window glass surpasses the position 200 mm below the upper stop position) is determined.

If the switch is ON (if the window glass does not surpass the position 200 mm below the upper stop position), in a step 330, the window glass is descended until it reaches the position where the switch turns OFF (the position 200 mm below the upper stop position). Furthermore, in a step 332, the measured value of the pulse signal is reset (cleared) to the initial value. This state is also shown in the timing chart in FIG. 39. On the other hand, if the switch is in OFF state (if the window glass surpasses the position 200 mm below the upper stop position and is positioned at a position lower than that) in a step 328, the window glass is moved down for a specified amount of time in a step 334, furthermore, the measured value of the pulse signal is reset (cleared) to the initial value in the step 332.

On the other hand, when the operation of the ascent switch 226 is not checked in the step 320, the operation of the descent switch is checked in a step 336. When the descent switch 228 is operated, in a step 338, the motor 10 actuates in the reverse direction and the window glass descends. Furthermore, in a step 340, whether or not the switch is in ON state (whether or not the window glass surpasses the position 200 mm below the upper stop position) is determined. If the switch is in OFF state (if the window glass surpasses the position 200 mm below the upper stop position and is positioned at a position lower than that), the measured value of the pulse signal is reset (cleared) to the initial value in the step 332.

If the operation of the descent switch 228 is not checked in a step 336, the process moves on to a step 342. In the step 342, whether or not the set switch 230 for the pulse number memorization is connected to the control circuit 224 (that is, whether or not the operation for storing the pulse correction value is carried out) is determined.

When the set switch 230 has been operated in order to store the pulse correction value, in a step 344, whether or not the switch is in ON state (whether or not the window glass surpasses the position 200 mm below the upper stop position and is within the pulse signal detection range) is determined. If the window glass is within the pulse signal detection range, whether or not the measured value of the pulse signal is a correct value (that is, whether or not the switch is turned ON/OFF for more than once and the measured value of the pulse signal is reset at the initial value) is determined in a step 346. If the measured value of the pulse signal is the correct value, whether or not the window glass stops is determined in a step 348. Thus, through the steps 342 through 348, the conditions for storing the pulse correction value are fulfilled.

As described, in the position control method for a moving body (a window glass) described in the seventh embodiment, the pulse signal value corresponding to the move amount of the window glass between the reference move position (the position 200 mm below the upper stop position of the window glass) to the specified move position (the position 4 mm below the bottom end position of the run channel 232, that is, the closed range) is once measured and then stored. Furthermore, after that, the fact that the window glass ascends and reaches the reference move position is detected by the switch portion, and the move amount of the window glass moving beyond the reference move position is detected as the pulse signal by the rotation sensor. Based on the measured value of the pulse signal and the stored pulse signal value, whether or not the window glass reaches the specified move position is determined.

That is, no matter where the reference move position is set (even if it is not set at the position 200 mm away from the upper stop position), since the move amount of the window glass is detected and controlled based on the pulse signal, even though the reference move position is different from vehicle to vehicle to which the reference move position is applied, the window glass passes the reference move position once (by resetting the measured value of the pulse signal to the initial value by turning ON/OFF the switch for at least once) so that the further move position of the window glass can be detected linearly and accurately. Also, whether or not the window glass reaches the specified move position (the closed range) is determined. In other words, since the reference move position can be set at any position, it is not necessary to change the switch (itself, the installation position, the ON/OFF timing or the like) from vehicle to vehicle, thereby the unit can be commonized (standardized).

Furthermore, in the position control method for a moving body (a window glass) described in the seventh embodiment, in the state in which the window glass does not reach the reference move position, the measured value of the pulse signal by the rotation sensor is reset at the initial value and whether or not there is something caught in the window glass is determined. At the time of catching, when the window glass surpasses the reference move position and the switch portion is turned ON (the window glass is between the reference move position and the specified move position), the window glass is moved down until the switch is turned OFF (until the window glass passes the reference move position). Thus, at this time, since the measured value of the pulse signal by the rotation sensor is always reset at the initial value, for example, even though errors occur in the measured-value of the pulse signal due to the influence of noises or the like, it can be quickly returned to the correct state, and the further measurement of the pulse signal can be carried out accurately without errors.

In the position control method for a moving body (window glass) described in the seventh embodiment, the pulse signal value corresponding to the move amount of the window glass between the reference move position to the specified move position (the closed range) is once measured and stored as the pulse correction value. However, the pulse correction value is set (stored) in advance at a fixed value. In this case, steps 342 through 350 of the control program shown in FIG. 38 can be omitted so that the cost can be minimized.

In the first through seventh embodiments, the position detectors 30, 70, 90, 140, 160, 190, 210 or the like detect and control the rotation position of the output shaft (the shaft 20) of the motor 10 for the power window device. However, the present invention is not limited to this application and can be applied to other cases of detecting and controlling the move position of a moving body (for example, a sun roof or the like moving on guide rails) moving back and forth on a straight line.

Further, in the above-described embodiments, the protrusion 40 may be formed in the cover plate 36 in place on the base plate 34, and the guide wall 98 for guiding the move pin 100 may be formed in the cover plate 94 in place of the base plate 92 while forming the guide groove 114 on the top surface of the rotation plate 106.

As described above, the present invention can accurately detect the specified move position of a moving body of a motor output shaft or the like and when it is applied to a power window device and a sun roof device, it not only accurately detect a position of a window glass or a sun roof but also accurately control the movement. The initial position can be set easily without cumbersome positional adjustment at the time of assembling and cumbersome resetting after the assembling work. This can be realized by a simple mechanism and in low cost.

The present invention has been described with reference to various embodiments but may be modified in many other ways without departing from the spirit of the invention.

What is claimed is:

1. A position detector for a moving body for detecting a specified move position of the moving body moving in forward and reverse directions to drive an object, said detector comprising:

a switch section for detecting a specified move position of a moving body through operation of contacts that turn ON and OFF;

an actuation mechanism operatively linked with said moving body to move with said moving body through a moving force transmitted from said moving body and to actuate said switch section when said moving body moves to said specified move position; and a clutch mechanism operatively coupled with said actuation mechanism to transmit the moving force of said moving body to said actuation mechanism until said switch section is actuated and, after said switch section is actuated, to shut off transmission of the moving force in a forward direction from said moving body to said actuation mechanism while maintaining an actuated state of said switch section to allow further movement of the moving body, said moving body having an output shaft which has a gear at one end to drive the object, and a driving mechanism at another end of the output shaft to drive said actuation mechanism; and said switch section, said actuation mechanism and said clutch mechanism being disposed on substantially the same plane as said driving mechanism that is disposed at said another end of said output shaft.

2. A position detector for a moving body according to claim 1, wherein:

said switch section detects a specified rotation position of said output shaft;

said actuation mechanism is operatively linked to said output shaft to actuate said switch section at the specified rotation position of said output shaft; and said clutch mechanism transmits a rotation force of said output shaft to said actuation mechanism and, when said switch section is actuated, shuts off the rotation force in the forward direction from said output shaft to said actuation mechanism.

3. A position detector for a moving body for detecting a specified move position of the moving body moving in forward and reverse directions, said detector comprising:

a switch section for detecting a specified move position of a moving body through operation of contacts that turn ON and OFF;

an actuation mechanism operatively linked with said moving body to move with said moving body through a moving force transmitted from said moving body and to actuate said switch section when said moving body moves to said specified move position;

a clutch mechanism operatively coupled with said actuation mechanism to transmit the moving force of said moving body to said actuation mechanism until said switch section is actuated and, after said switch section is actuated, to shut off transmission of the moving force in a forward direction from said moving body to said actuation mechanism while maintaining an actuated state of said switch section to allow further movement of the moving body; and initial position correction means provided to operate said actuation mechanism externally to set said actuation mechanism to an initial state where said switch has operated, regardless of a rotation position of said output shaft.

4. A position detector for a moving body for detecting a specified move position of the moving body moving in forward and reverse directions, said detector comprising:

a switch section for detecting a specified move position of a moving body through operation of contacts that turn ON and OFF;

an actuation mechanism operatively linked with said moving body to move with said moving body through a moving force transmitted from said moving body and to actuate said switch section when said moving body moves to said specified move position;

a clutch mechanism operatively coupled with said actuation mechanism to transmit the moving force of said moving body to said actuation mechanism until said switch section is actuated and, after said switch section is actuated, to shut off transmission of the moving force in a forward direction from said moving body to said actuation mechanism while maintaining an actuated state of said switch section to allow further movement of the moving body;

pulse generation means provided in said actuation mechanism and generating pulses following the actuation of said actuation mechanism; and pulse detection means detecting the pulses generated by said pulse generation means.

5. A position detector for a moving body for detecting a specified move position of the moving body moving in forward and reverse directions, said detector comprising:

a switch section for detecting a specified move position of a moving body through operation of contacts that turn ON and OFF;

an actuation mechanism operatively linked with said moving body to move with said moving body through a moving force transmitted from said moving body and to actuate said switch section when said moving body moves to said specified move position, said actuation mechanism including a ring gear having a flange portion, said switch section including a movable contact positioned on the flange portion of the ring gear and at least one fixed contact which is contacted by the movable contact when said moving body reaches the specified move position; and a clutch mechanism operatively coupled with said actuation mechanism to transmit the moving force of said moving body to said actuation mechanism until said switch section is actuated and, after said switch section is actuated, to shut off transmission of the moving force in a forward direction from said moving body to said actuation mechanism while maintaining an actuated state of said switch section to allow further movement of the moving body.

6. A position detector for a moving body for detecting a specified move position of the moving body moving in forward and reverse directions, said detector comprising:

a switch section for detecting a specified move position of a moving body through operation of contacts that turn ON and OFF;

an actuation mechanism operatively linked with said moving body to move with said moving body through a moving force transmitted from said moving body and to actuate said switch section when said moving body moves to said specified move position, said actuation mechanism including a ring gear and a planetary gear; and a clutch mechanism operatively coupled with said actuation mechanism to transmit the moving force of said moving body to said actuation mechanism until said switch section is actuated and, after said switch section is actuated, to shut off transmission of the moving force in a forward direction from said moving body to said actuation mechanism while maintaining an actuated state of said switch section to allow further movement of the moving body.

7. A position detector for a moving body for detecting a specified move position of the moving body moving in forward and reverse directions, said detector comprising:
- a switch section for detecting a specified move position of a moving body through operation of contacts that turn ON and OFF;
- an actuation mechanism operatively linked with said moving body to move with said moving body through a moving force transmitted from said moving body and to actuate said switch section when said moving body moves to said specified move position; and
- a clutch mechanism operatively coupled with said actuation mechanism to transmit the moving force of said moving body to said actuation mechanism until said switch section is actuated and, after said switch section is actuated, to shut off transmission of the moving force in a forward direction from said moving body to said actuation mechanism while maintaining an actuated state of said switch section to allow further movement of the moving body, said clutch mechanism being a wave washer.

8. A position detector for a moving body for detecting a specified move position of an output shaft of a motor rotating in forward and reverse directions, said detector comprising:
- a switch section for detecting a specified rotation position of the output shaft through operation of contacts that turn ON and OFF;
- an actuation mechanism operatively linked with said output shaft to rotate said output shaft through a moving force transmitted from said output shaft and to actuate said switch section when said output shaft rotates to said specified rotation position; and
- a clutch mechanism operatively coupled with said actuation mechanism to transmit the moving force of said moving body to said actuation mechanism and, after said switch section is actuated, to shut off transmission of the moving force in a forward direction from said output shaft to said actuation mechanism;
- said actuation mechanism has a ring gear and a planetary gear that operate as a planetary gear train unit linked with said output shaft;
- said switch section is equipped with a moving contact that rotates with said ring gear and a fixed contact that contacts said moving contact, said moving contact being formed integrally with said ring gear of said planetary gear train unit; and
- said clutch mechanism normally rotating said ring gear by transmitting the rotation force of said output shaft from said planetary gear to said ring gear by stopping revolution of said planetary gear and, when said moving contact is in contact with said fixed contact, shutting off the rotation force in the forward direction from said output shaft to said ring gear by allowing the revolution of said planetary gear.

9. A position detector for a moving body for detecting a specified move position of an output shaft of a motor rotating in forward and reverse directions, said detector comprising:
- a switch section for detecting a specified rotation position of the output shaft through operation of contacts that turn ON and OFF;
- an actuation mechanism operatively linked with said output shaft to rotate said output shaft through a moving force transmitted from said output shaft and to actuate said switch section when said output shaft rotates to said specified rotation position; and
- a clutch mechanism operatively coupled with said actuation mechanism to transmit the moving force of said moving body to said actuation mechanism and, after said switch section is actuated, to shut off transmission of the moving force in a forward direction from said output shaft to said actuation mechanism;
- said actuation mechanism is equipped with a rotation plate formed with a spiral guide groove, and a move pin that fits into said guide groove and moves in a radial direction of said rotation plate according to the rotation of said rotation plate;
- said switch section is a limit switch positioned in correspondence to a radially outer edge of the rotation plate and fitted with said move pin for operation; and
- said clutch mechanism normally connecting said rotation plate with said output shaft integrally to transmit the rotation force of said output shaft to said rotation plate for rotation of said rotation plate and, after said limit switch is actuated, shutting off the transmission of the rotation force in the forward direction from said output shaft to said rotation plate by releasing a connection between said rotation plate and said output shaft.

10. A position detector for a moving body for detecting a specified move position of the moving body moving in forward and reverse directions, said detector comprising:
- a switch section for detecting a specified move position of a moving body through operation of contacts that turn ON and OFF;
- an actuation mechanism operatively linked with said moving body to move with said moving body through a moving force transmitted from said moving body and to actuate said switch section when said moving body moves to said specified move position;
- a clutch mechanism operatively coupled with said actuation mechanism to transmit the moving force of said moving body to said actuation mechanism until said switch section is actuated and, after said switch section is actuated to shut off transmission of the moving force in a forward direction from said moving body to said actuation mechanism while maintaining an actuated state of said switch section to allow further movement of the moving body; and
- said switch section including a rotation plate formed with a first protrusion and said actuation mechanism includes one of a base plate and a cover plate fixedly held relative to said rotation plate and formed with a second protrusion which is engageable with said first protrusion.

11. A position detector for a moving body according to claim 10, wherein said rotation plate is so arranged as that said contacts of said switch section are operated at a rotary position of said rotation plate a predetermined angle upstream than a rotary position of the same where said first protrusion engages said second protrusion.

12. A position detector for a moving body for detecting a specified move position of the moving body moving in forward and reverse directions, said detector comprising:
- a switch section for detecting a specified move position of a moving body through operation of contacts that turn ON and OFF;

an actuation mechanism operatively linked with said moving body to move with said moving body through a moving force transmitted from said moving body and to actuate said switch section when said moving body moves to said specified move position;

a clutch mechanism operatively coupled with said actuation mechanism to transmit the moving force of said moving body to said actuation mechanism until said switch section is actuated and, after said switch section is actuated, to shut off transmission of the moving force in a forward direction from said moving body to said actuation mechanism while maintaining an actuated state of said switch section to allow further movement of the moving body; and said actuation mechanism including a rotation plate formed with a spiral groove and an extension edge, said actuation mechanism further including a move pin movable in said spiral groove to actuate said switch section when moved close to said extension end.

13. A position detector for a moving body according to claim 12, wherein said actuation mechanism includes a cover plate and a base plate one of which is formed with a guide wall for guiding a movement of said move pin radially.

14. A position control method for controlling a move position of a moving body that moves in forward and reverse directions, said method comprising the steps of:

setting switch means at a position which corresponds to a reference move position as a standard within a moving range of a moving body, said switch means being actuatable by an actuating mechanism movable with said moving body;

detecting, by said switch means, whether or not said moving body has reached said reference move position;

stopping movement of said actuation mechanism by a clutch when said switch means detects that said moving body has reached the reference move position, said clutch allowing further movement of said moving body after said actuation mechanism is stopped;

detecting a move amount of said moving body during said further movement in a forward direction by move amount detection means that detects by pulse signals and determining whether or not said moving body has reached a specified move position based on the move amount detected by said move amount detection means.

15. A position control method for a moving body according to claim 14 further comprising the step of:

measuring and memorizing a pulse signal value corresponding to the move amount of said moving body from said reference move position to said specified move position, wherein said determining step determines whether or not said moving body has reached the specified move position based on said memorized pulse signal value and a measured value of pulse signals detected by said move amount detection means.

16. A position control method for a moving body according to claim 14 further comprising the step of:

setting in advance a pulse signal value corresponding to the move amount of said moving body from said reference move position to said specified move position, wherein said determining means determines whether or not said moving body has reached said specified move position based on said set pulse signal value and a measured value of the pulse signals detected by said move amount detection means.

17. A position control method for a moving body according to claim 14 further comprising the steps of:

resetting, when said moving body does not reach said reference move position, the measured value of the pulse signals detected by said move amount detection means to an initial value;

determining whether or not said moving body is catching something; and effecting a reverse direction move of said moving body until it passes said reference move position, when said moving body exists between said reference move position and said specified position at a time of determination that said moving body is catching something.

18. A window regulating apparatus for motor vehicles comprising:

a window glass movably held in a frame;

an electric motor having a motor shaft for driving said window glass when energized;

a reduction mechanism having a worm wheel driven by said motor shaft and an output shaft disposed in a radial center of said worm wheel for rotation with the worm wheel;

an extension member extending axially from said output shaft;

a switch;

a rotation plate operatively coupled with said extension member to be driven by said extension member in a rotation direction, said rotation plate being disposed on substantially the same plane as said extension member and formed with means for restricting rotation of said rotation plate, said rotation plate actuating said switch when said rotation plate rotates to a first predetermined position; and a clutch operatively coupled with said rotation plate to enable transmission of rotation of said electric motor to said rotation plate until said rotation plate rotates to a second predetermined position and to disable transmission of rotation of said electric motor to said rotation plate after said rotation plate rotates to said second predetermined position while still allowing rotation of said electric motor, said first predetermined rotation position being upstream of said second predetermined rotation position with respect to the rotation direction by a predetermined rotation angle of said rotation plate.

19. A window regulating apparatus for motor vehicles comprising:

a window glass movably held in a frame;

an electric motor for driving said window glass when energized;

a switch;

a rotation plate operatively coupled with said motor to be driven by the motor in a rotation direction, said rotation plate being formed with means for restricting rotation of said rotation plate, said rotation plate actuating said switch when said rotation plate rotates to a first predetermined position; and a clutch operatively coupled with said rotation plate to enable transmission of rotation of said electric motor to said rotation plate until said rotation plate rotates to a second predetermined position and to disable transmission of rotation of said electric motor to said rotation plate after said rotation plate rotates to said second predetermined position while still allowing rotation of said electric motor, said first predetermined rotation position being upstream of said second predetermined rotation position with respect to the rotation direction by a predetermined rotation angle of said rotation plate, the clutch being a wave washer.

20. A window regulating apparatus for motor vehicles comprising:

a window glass movably held in a frame;

an electric motor for driving said window glass when energized;

a switch;

a rotation plate operatively coupled with said motor to be driven by the motor in a rotation direction, said rotation plate being formed with means for restricting rotation of said rotation plate, said rotation plate actuating said switch when said rotation plate rotates to a first predetermined position; and a clutch operatively coupled with said rotation plate to enable transmission of rotation of said electric motor to said rotation plate until said rotation plate rotates to a second predetermined position and to disable transmission of rotation of said electric motor to said rotation plate after said rotation plate rotates to said second predetermined position while still allowing rotation of said electric motor, said first predetermined rotation position being upstream of said second predetermined rotation position with respect to the rotation direction by a predetermined rotation angle of said rotation plate, the switch including a contact provided on said rotation plate and at least one fixed contact for contacting the contact on the rotation plate when the rotation plate reaches the first predetermined position.

21. A window regulating apparatus for motor vehicles comprising:

a window glass movably held in a frame;

an electric motor accommodated in a housing for driving said window glass when energized;

an output shaft accommodated in said housing and an output gear at a first end of said output shaft for driving said window glass;

a switch;

a rotation plate operatively coupled with a second end of said output shaft to be driven by the motor in a rotation direction, said rotation plate being formed with means for restricting rotation of said rotation plate, said rotation plate actuating said switch when said rotation plate rotates to a first predetermined position; and a clutch operatively coupled with said rotation plate to enable transmission of rotation of said electric motor to said rotation plate until said rotation plate rotates to a second predetermined position and to disable transmission of rotation of said electric motor to said rotation plate after said rotation plate rotates to said second predetermined position while still allowing rotation of said electric motor, said first predetermined rotation position being upstream of said second predetermined rotation position with respect to the rotation direction by a predetermined rotation angle of said rotation plate.

* * * * *

UNITED STATES PATENT AND TRADEMARK OFFICE
CERTIFICATE OF CORRECTION

PATENT NO. : 5,773,947
DATED : June 30, 1998
INVENTOR(S) : Torii, et al

It is certified that error appears in the above-identified patent and that said Letters Patent is hereby corrected as shown below:

On the title page, under item [56], insert the following:

U. S. PATENT DOCUMENTS

| EXAMINER INITIAL | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|
| | | 4 | 6 | 5 | 0 | 2 | 6 | 4 | 3/17/87 | Dahnert | | | |
| | | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 2 | 1 | 8 | 7 | 5 | 8 | 2 | 9/9/87 | United Kingdom | | | | |
| | | | | | | | | | | | | | | |

Signed and Sealed this

Second Day of March, 1999

Attest:

Attesting Officer

Q. TODD DICKINSON

Acting Commissioner of Patents and Trademarks